United States Patent
Saha et al.

(10) Patent No.: US 6,266,091 B1
(45) Date of Patent: Jul. 24, 2001

(54) SYSTEM AND METHOD FOR LOW DELAY MODE OPERATION VIDEO DECODING

(75) Inventors: Angshuman Saha, Milpitas; Satish Soman, Cupertino; Surya P. Varanasi, Tracy, all of CA (US)

(73) Assignee: LSI Logic Corporation

( * ) Notice: Subject to any disclaimer, the term of this patent is extended or adjusted under 35 U.S.C. 154(b) by 0 days.

(21) Appl. No.: 08/920,511

(22) Filed: Aug. 29, 1997

Related U.S. Application Data

(63) Continuation-in-part of application No. 08/904,084, filed on Jul. 31, 1997.

(51) Int. Cl.[7] .............................. H04N 7/36; H04N 7/50
(52) U.S. Cl. .................... 348/402; 348/845; 348/845.2; 382/233
(58) Field of Search ................................. 348/390, 412, 348/413, 416, 423, 714, 715, 716, 845, 845.2, 400, 401, 402; 382/232, 233, 236

(56) References Cited

U.S. PATENT DOCUMENTS

| | | | |
|---|---|---|---|
| 3,867,579 | 2/1975 | Colton et al. | 179/15 A |
| 4,211,997 | 7/1980 | Rudnick et al. | 371/38 |
| 4,241,398 | 12/1980 | Carll | 364/200 |
| 4,394,774 | 7/1983 | Widergren et al. | 392/56 |
| 4,649,536 | 3/1987 | Krinock | 370/102 |
| 4,660,079 | 4/1987 | Devimeux et al. | 358/141 |
| 4,675,886 | 6/1987 | Surie | 375/116 |
| 4,839,733 | 6/1989 | Karamon et al. | 358/341 |
| 5,202,761 | 4/1993 | Cooper | 358/149 |
| 5,287,182 | 2/1994 | Haskell et al. | 348/500 |
| 5,294,983 | 3/1994 | Ersoz et al. | 348/521 |
| 5,299,236 | 3/1994 | Pandula | 375/116 |
| 5,351,000 | 9/1994 | Nakamura | 348/484 |
| 5,351,092 | 9/1994 | Poimboeuf et al. | 348/512 |
| 5,361,097 | 11/1994 | Kolczynski | 348/390 |
| 5,386,233 | 1/1995 | Keith | 348/407 |
| 5,392,037 | 2/1995 | Kato | 341/67 |
| 5,394,189 | 2/1995 | Motomura et al. | 348/402 |
| 5,396,497 | 3/1995 | Veltman | 370/100.1 |
| 5,420,801 | 5/1995 | Dockter et al. | 364/514 |
| 5,430,485 | 7/1995 | Lankford et al. | 348/423 |
| 5,442,390 | 8/1995 | Hooper et al. | 348/7 |
| 5,446,839 | 8/1995 | Dea et al. | 395/163 |
| 5,448,568 | 9/1995 | Delpuch et al. | 372/94.2 |
| 5,450,248 | 9/1995 | Van Eijck et al. | 360/32 |
| 5,467,139 | 11/1995 | Lankford | 348/512 |

(List continued on next page.)

OTHER PUBLICATIONS

MacInnis, Alexander G. (Sandy), MPEG Systems Committee Draft ISO/IEC JTC1/SC2/WG11; IEEE; 1991; pp. 338–341.

Maturi, Greg; Single Chip MPEG Audio Decoder; IEEE; Aug. 1992; pp. 348–356.

Systems Committee; International Organization for Standarization: Coding of Moving Pictures and Associated Audio; Sep., 1993; pp. 1–66.

*Primary Examiner*—Howard Britton

(57) ABSTRACT

A system and method for low delay mode operation video decoding embodied in a prefetch buffer and an mbcore including an mbcore pipeline. The mbcore is adapted to check a status of the prefetch buffer at predetermined times and to implement a low delay mode to delay the mbcore pipeline when a data level of the prefetch buffer goes below a threshold at the predetermined times. The mbcore is adapted to ensure that there is a sufficient quantity of data in the prefetch buffer for a particular operation and, in a preferred embodiment, is adapted to check the status of the prefetch buffer at a start of a slice, at a beginning of dct decoding of each coded block. The prefetch buffer and the mbcore operate asynchronously, with the mbcore being adapted to prevent a symbol from splitting between the prefetch buffer and the mbcore.

20 Claims, 15 Drawing Sheets

U.S. PATENT DOCUMENTS

| | | | |
|---|---|---|---|
| 5,502,494 | 3/1996 | Auld | 348/426 |
| 5,502,573 | 3/1996 | Fujinami | 358/339 |
| 5,510,857 | 4/1996 | Kopet et al. | 348/699 |
| 5,521,922 | 5/1996 | Fujinami et al. | 370/84 |
| 5,559,999 | 9/1996 | Maturi et al. | 395/550 |
| 5,568,200 | 10/1996 | Pearlstein et al. | 348/426 |
| 5,588,029 | 12/1996 | Maturi et al. | 375/364 |
| 5,596,369 | 1/1997 | Chau | 348/402 |
| 5,598,506 | 1/1997 | Wigren et al. | 395/2.42 |
| 5,600,844 * | 2/1997 | Shaw | 348/384 |
| 5,644,310 | 7/1997 | Laczko, Sr. et al. | 341/143 |
| 5,649,029 | 7/1997 | Galbi | 382/233 |
| 5,657,423 | 8/1997 | Benbassat et al. | 395/2.39 |
| 5,710,602 * | 1/1998 | Gardos | 348/586 |
| 5,815,206 * | 9/1998 | Malladi | 348/390 |
| 5,818,533 * | 10/1998 | Auld | 348/412 |

* cited by examiner

SYSTEM AND METHOD FOR LOW DELAY MODE OPERATION VIDEO DECODING

CROSS-REFERENCE TO RELATED APPLICATION

This application is a continuation-in-part of U.S. patent application Ser. No. 08/904,084, filed Jul. 31, 1997, entitled ARCHITECTURE FOR DECODING MPEG COMPLIANT VIDEO BITSTREAMS MEETING 2-FRAME AND LETTERBOXING REQUIREMENTS, by Surya P. Varamasi and Satish Soman.

BACKGROUND OF THE INVENTION

1. Field of the Invention

This invention relates generally to the field of multimedia systems, and more particularly to a video decoding device having the ability to meet particular predetermined transmission and display constraints. The video decoding device is particularly suited for Motion Picture Expert Group (MPEG) data compression and decompression standards.

2. Description of the Related Art

Multimedia software applications including motion pictures and other video modules employ MPEG standards in order to compress, transmit, receive, and decompress video data without appreciable loss. Several versions of MPEG currently exist or are being developed, with the current standard being MPEG-2. MPEG-2 video is a method for compressed representation of video sequences using a common coding syntax. MPEG-2 replaces MPEG-1 and enhances several aspects of MPEG-1. The MPEG-2 standard includes extensions to cover a wider range of applications, and includes the addition of syntax for more efficient coding of interlaced video and the occurrence of scalable extensions which permit dividing a continuous video signal into multiple coded bitstreams representing video at different resolutions, picture quality, or frame rates. The primary target application of MPEG-2 is the all-digital broadcast of TV quality video signals at coded bitrates between 4 and 9 Mbit/sec. MPEG-1 was optimized for CD-ROM or applications transmitted in the range of 1.5 Mbit/sec, and video was unitary and non-interlaced.

An encoded/compressed data stream may contain multiple encoded/compressed video and/or audio data packets or blocks. MPEG generally encodes or compresses video packets based on calculated efficient video frame or picture transmissions.

Three types of video frames are defined. An intra or I-frame is a frame of video data including information only about itself. Only one given uncompressed video frame can be encoded or compressed into a single I-frame of encoded or compressed video data.

A predictive or P-frame is a frame of video data encoded or compressed using motion compensated prediction from a past reference frame. A previous encoded or compressed frame, such as an I-frame or a P-frame, can be used when encoding or compressing an uncompressed frame of video data into a P-frame of encoded or compressed video data. A reference frame may be either an I-frame or a P-frame.

A bidirectional or B-frame is a frame of video data encoded or compressed using motion compensated prediction from a past and future reference frame. Alternately, the B-frame may use prediction from a past or a future frame of video data. B-frames are particularly useful when rapid motion occurs within an image across frames.

Motion compensation refers to the use of motion vectors from one frame to improve the efficiency for predicting pixel values of an adjacent frame or frames. Motion compensation is used for encoding/compression and decoding/decompression. The prediction method or algorithm uses motion vectors to provide offset values, error information, and other data referring to a previous or subsequent video frame.

The MPEG-2 standard requires encoded/compressed data to be encapsulated and communicated using data packets. The data stream is comprised of different layers, such as an ISO layer and a pack layer. In the ISO layer, packages are transmitted until the system achieves an ISO end code, where each package has a pack start code and pack data. For the pack layer, each package may be defined as having a pack start code, a system clock reference, a system header, and packets of data. The system clock reference represents the system reference time.

While the syntax for coding video information into a single MPEG-2 data stream are rigorously defined within the MPEG-2 specification, the mechanisms for decoding an MPEG-2 data stream are not. This decoder design is left to the designer, with the MPEG-2 spec merely providing the results which must be achieved by such decoding.

Devices employing MPEG-1 or MPEG-2 standards consist of combination transmitter/encoders or receiver/decoders, as well as individual encoders or decoders. The restrictions and inherent problems associated with decoding an encoded signal and transmitting the decoded signal to a viewing device, such as a CRT or HDTV screen indicate that design and realization of an MPEG-compliant decoding device is more complex than that of an encoding device. Generally speaking, once a decoding device is designed which operates under a particular set of constraints, a designer can prepare an encoder which encodes signals at the required constraints, said signals being compliant with the decoder. This disclosure primarily addresses the design of an MPEG compliant decoder.

Various devices employing MPEG-2 standards are available today. Particular aspects of known available decoders will be described.

Frame Storage Architecture

Previous systems used either three or two and a half frame storage for storage in memory.

Frame storage works as follows. In order to enable the decoding of B-frames, two frames worth of memory must be available to store the backward and forward anchor frames. Most systems stored either a three frame or two and a half frames to enable B-frame prediction. While the availability of multiple frames was advantageous (more information yields an enhanced prediction capability), but such a requirement tends to require a larger storage buffer and takes more time to perform prediction functions. A reduction in the size of memory chips enables additional functions to be incorporated on the board, such as basic or enhanced graphic elements, or channel decoding capability. These elements also may require memory access, so incorporating more memory on a fixed surface space is highly desirable. Similarly, incorporating functional elements requiring smaller memory space on a chip is also beneficial.

Scaling

The MPEG-2 standard coincides with the traditional television screen size used today, thus requiring transmission having dimensions of 720 pixels (pels) by 480 pixels. The television displays every other line of pixels in a raster scan The typical television screen interlaces lines of pels, sequentially transmitting every other line of 720 pels (a total of 240 lines) and then sequentially transmitting the remaining 240 lines of pels. The raster scan transmits the full frame at 1/30 second, and thus each half-frame is transmitted at 1/60 second.

For MPEG storage method of storing two and a half frames for prediction relates to this interlacing design. The two and a half frame store architecture stores two anchor frames (either I or P) and one half of a decoded B frame. A frame picture is made up of a top and a bottom field, where each field represents interlaced rows of pixel data. For example, the top field may comprise the first, third, fifth, and so forth lines of data, while the bottom field comprises the second forth, sixth, and so on lines of data. When B frames are decoded, one half the picture (either the top field or the bottom field) is displayed. The other half picture must be stored for display at a later time. This additional data accounts for the "half frame" in the two and a half frame store architecture.

In a two frame store architecture, there is no storage for the second set of interlaced lines that has been decoded in a B-frame. Therefore, an MPEG decoder that supports a two frame architecture must support the capability to decode the same picture twice in the amount of time it takes to display one picture. As there is no place to store decoded B-frame data, the output of the MPEG decoder must be displayed in real time. Thus the MPEG decoder must have the ability to decode fast enough to display a field worth of data.

A problem arises when the picture to be displayed is in what is called the "letterbox" format. The letterbox format is longer and narrower than the traditional format, at an approximately 16:9 ratio. Other dimensions are used, but 16:9 is most common. The problem with letterboxing is that the image is decreased when displayed on screen, but picture quality must remain high. The 16:9 ratio on the 720 by 480 pel screen requires picture on only ¾ of the screen, while the remaining ¼ screen is left blank. In order to support a two-frame architecture with a letterboxing display which takes ¾ of the screen, a B-frame must be decoded in ¾ the time taken to display a field of data.

The requirements to perform a two frame store rather than a two and a half or three frame store coupled with the desire to provide letterbox imaging are significant constraints on system speed which have not heretofore been achieved by MPEG decoders.

It is therefore an object of the current invention to provide an MPEG decoding system which operates at 54 Mhz and sufficiently decodes an MPEG data stream while maintaining sufficient picture quality.

It is a further object of the current invention to provide an MPEG decoder which supports two frame storage.

It is another object of the current invention to provide a memory storage arrangement that minimizes on-chip space requirements and permits additional memory and/or functions to be located on the chip surface. A common memory area used by multiple functional elements is a further objective of this invention.

It is yet another object of the current invention to provide an MPEG decoder which supports signals transmitted for letterbox format.

SUMMARY OF THE INVENTION

In a preferred exemplary embodiment of the present invention, a system for low delay mode operation video decoding includes a prefetch buffer and an mbcore including an mbcore pipeline. The mbcore is adapted to check a status of the prefetch buffer in a predetermined manner and to implement a low delay mode to delay the mbcore pipeline when a data level of the prefetch buffer goes below a threshold.

In another aspect of the present invention, a system for low delay mode operation video decoding includes a prefetch buffer and an mbcore including an mbcore pipeline. The mbcore is adapted to check a status of the prefetch buffer at predetermined times including a time at a start of a slice, a time at a beginning of dct decoding, and a time at a beginning of a coded block, and to implement a low delay mode to delay the mbcore pipeline when a data level of the prefetch buffer goes below a threshold at predetermined times.

In another aspect of the present invention, a method for low delay mode operation video decoding includes the steps of: providing a prefetch buffer; and providing an mbcore including an mbcore pipeline, the mbcore being adapted to check a status of the prefetch buffer at predetermined times during an operation of the mbcore and to implement a low delay mode to delay the mbcore pipeline depending upon the status at the predetermined times.

Other objects, features, and advantages of the present invention will become more apparent from a consideration of the following detailed description and from the accompanying drawings.

DETAILED DESCRIPTION OF THE INVENTION

The requirements for supporting a two frame architecture as well as letterbox scaling are as follows, using NTSC. Letterbox scaling only transmits ¾ of a full screen, leaving the top and bottom eighth of the screen blank at all times. For letterbox scaling, a total of 360 (or ¾* 480) lines of active video must be displayed. For a two frame store system, with a 45 by 30 macroblock picture, 360 lines of active video divided by 30 * 525 seconds is available, or approximately 0.02286 seconds are available to decode the 45 by 30 macroblock arrangement. With 30 rows of macroblocks, the time to decode one full row of macroblocks is (360/(30 * 525))/30 seconds, or approximately 761.91 microseconds. The time to decode one macroblock is 761.91/45 or 16.93 microseconds. With two frame store, double decoding is necessary, and the time available to decode a macroblock is 16.93/2 microseconds, or 8.465 microseconds.

Decoder Architecture

Figure 1:
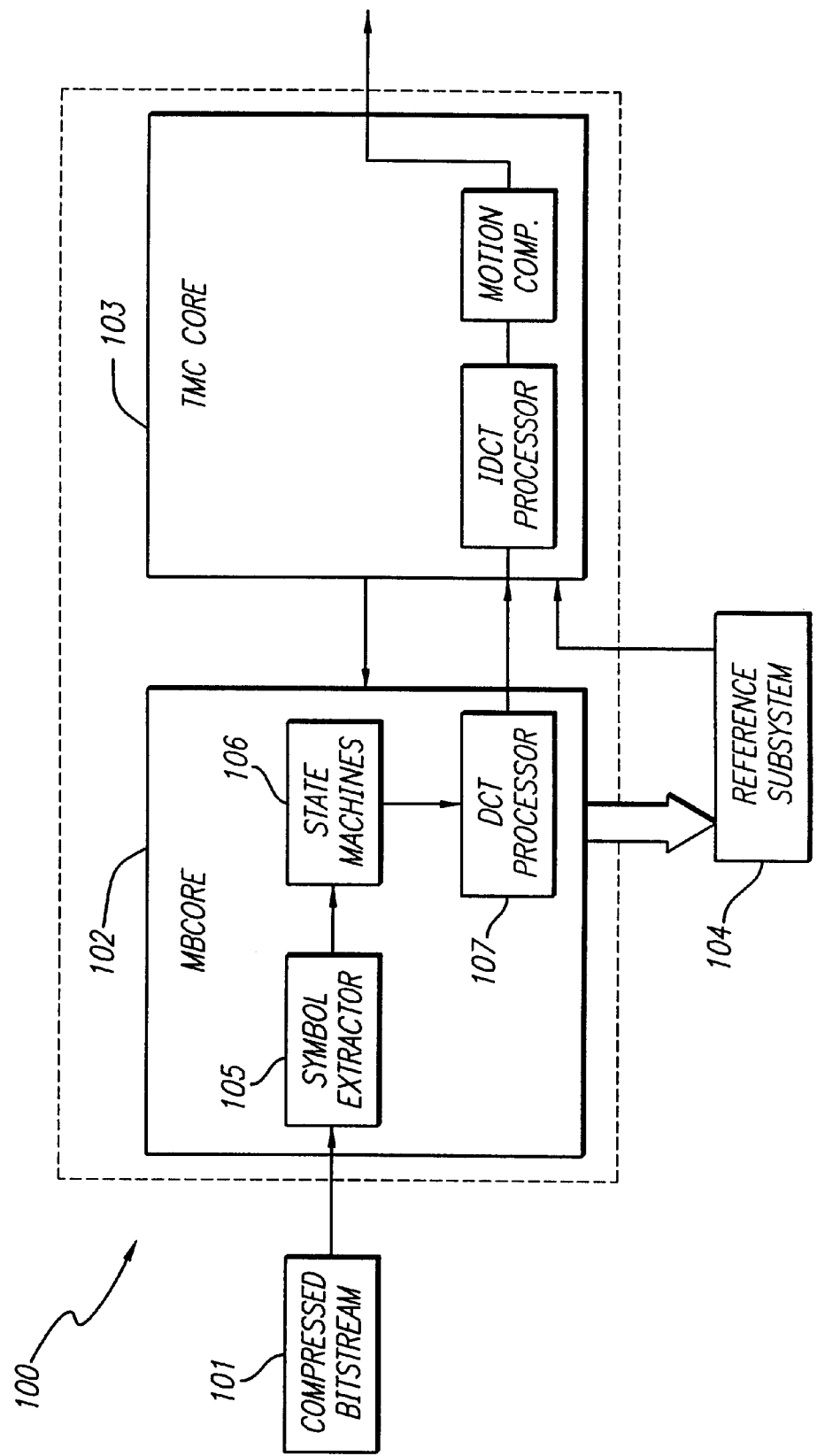
FIG. 1 illustrates the MPEG video decoder 100 according to the current invention.

FIG. 1 illustrates the MPEG video decoder 100 according to the current invention. The system passes the compressed bitstream 101 to MBCORE 102 (Macro Block core), which passes data to TMCCORE 103 (Transformation/Motion Compensation core) and Reference Subsystem 104. TMCCORE 103 passes information to MBCORE 102, and produces reconstructed macroblocks.

The MBCORE 102 operates as both a controller and a parser. The MBCORE 102 primary function is to parse the compressed bitstream 101 and generate DCT coefficients and motion vectors for all macroblocks. The DCT coefficients then pass to the TMCCORE 103 for further processing, and the MBCORE 102 passes the motion vectors to the Reference Subsystem 104 for further processing.

The MBCORE 102 comprises video bitstream symbol extractor 105 and state machines 106. MBCORE 102 reads the compressed bitstream 101 and if the compressed bitstream is in VLC (Variable Length Coding), the MBCORE decompresses the bitstream using the video bitstream symbol extractor 105, detailed below. The MBCORE further comprises DCT processor 107, which enables the MBCORE 102 to calculate and provide DCT coefficients to the TMCCORE 103 and motion vectors to the Reference Subsystem 104.

The TMCCORE 103 receives DCT and motion vector information for a series of macroblocks and performs the inverse discrete cosine transfer for all data received. The TMCCORE 103 receives the discrete cosine transfer data from the MBCORE 102, computes the inverse discrete cosine transform (IDCT) for each macroblock of data, computes a motion vector difference between the current frame and the reference frame by essentially "backing out" the difference between the current frame and reference frame, and combines this motion vector difference with the IDCT coefficients to produce the new frame using motion compensation. The TMCCORE 103 also executes pel compensation on reference data received from the Reference Subsystem 104, and reconstructs the new frame using information from the Reference Subsystem 104 and the MBCORE 102.

The Reference Subsystem 104 receives motion vectors from the MBCORE 102. The Reference Subsystem 104 determines the location of necessary motion related information, such as previous frame data and current frame data, to support the TMCCORE 103 in compensation and reconstruction. The Reference Subsystem 104 acquires such information and provides it to the TMCCORE 103.

As noted above, the timing for performing the necessary parsing, coefficient generation, transmission, and picture reconstruction functions is critical. Data is transmitted to the MBCORE 102 as follows: a slice header and macroblock data passes to the MBCORE 102, followed by the DCT coefficient data for a particular macroblock of data. The slice header and macroblock data take 30 cycles for transmission, and thus the MBCORE does not transmit DCT data for 30 cycles. Transmission of one macroblock of data requires the initial 30 cycle period, followed by six 64 cycle transmissions, and then the procedure repeats.

The MBCORE 102 takes 50 cycles to parse the video bitstream from the slice start code, i.e. a data block indicating the beginning of a particular bitstream arrangement, to generating the first coefficients for the IQ stage of the TMCCORE 103.

Operation of the MBCORE is as follows. The MBCORE initially accepts and parses the 50 cycles up to the block layer. The MBCORE then generates one DCT coefficient per cycle, and takes a total of (64+1) * 5+64 cycles, or 389 cycles, to generate all the DCT coefficients for a given macroblock. The MBCORE passes a total of 384 DCT coefficients (64 * 6) to the TMCCORE 103, which accepts one block of coefficient data into IDCT Stage 1.

Figure 2:
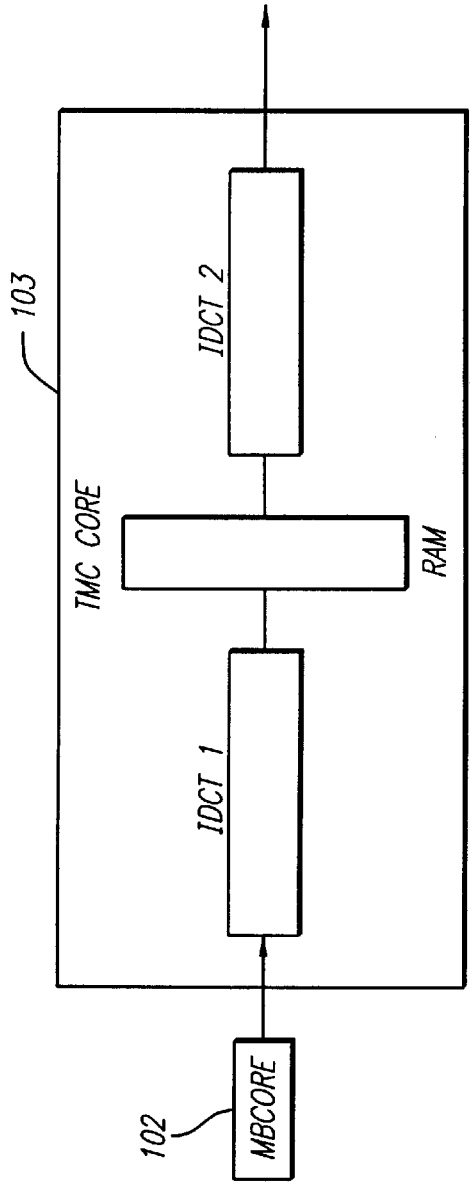
FIG. 2 is a detailed illustration of the TMCCORE in accordance with the current invention.

A detailed illustration of the TMCCORE is presented in FIG. 2. After a full block of IDCT coefficient data passes through the IDCT Stage 1 data path, which can conceptually be analogized to a pipeline, IDCT Stage 2 computation begins on the IDCT Stage 1 processed data. Hence IDCT Stage 1 data is stored by the system in RAM and the IDCT Stage 1 data is subsequently received by IDCT Stage 2 within the TMCCORE 103. IDCT Stage 1 operates as soon as it receives the data from the MBCORE 102. IDCT Stage 2, however, is one block delayed due to the processing, storage, and retrieval of the IDCT data. The arrangement of the timing of the IDCT stages and the transmission of data within the TMCCORE 103 are presented below.

Data Transmission Method

Figure 3:
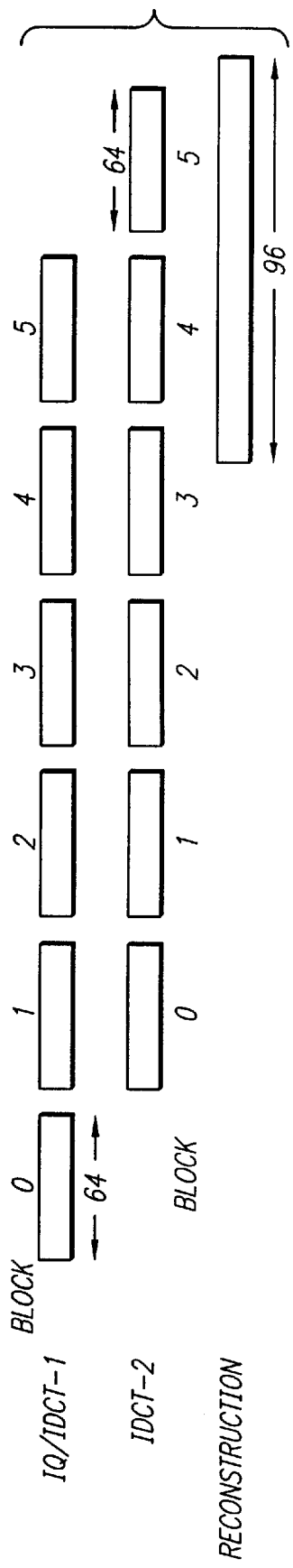
FIG. 3 presents the timing diagram for the transmission of data through the TMCCORE.

FIG. 3 presents the timing diagram for the transmission of data through the TMCCORE 103. From FIG. 3, the zero block of data, comprising 64 units of data and taking 64 cycles, is processed in the IQ/IDCT Stage 1 pipeline initially. A gap occurs between the six 64 blocks of data, taking one cycle. The one block of data is subsequently processed by the IQ/IDCT Stage 1 pipeline at the time the IDCT Stage 2 processes the zero block data. Processing continues in a staggered manner until the four block is processed in IDCT Stage 1 and the three block in IDCT Stage 2, at which time the system begins reconstruction of the picture.

With the 4:2:0 ratio, the TMCCORE 103 receives four luminance pixels and two chrominance pixels. At the end of the four luminance pixels, the TMCCORE 103 initiates reconstruction of the picture.

Total time for the process is 64 cycles multiplied by 6 blocks=384 cycles, plus five one cycle gaps, plus the 35 cycles for header processing, plus a trailing five cycles to complete reconstruction, for a total of 429 cycles. Reconstruction takes 96 cycles.

The staggered timing arrangement for processing the data permits the functions of the MBCORE 102 and TMCCORE 103 to overlap. This overlap permits the MBCORE 102 to operate on one macroblock of data while the TMCCORE 103 operates on a second macroblock. Prior systems required full loading of a single macroblock of data before processing the data, which necessarily slowed the system down and would not permit two-frame store and letterbox scaling.

Figure 4:
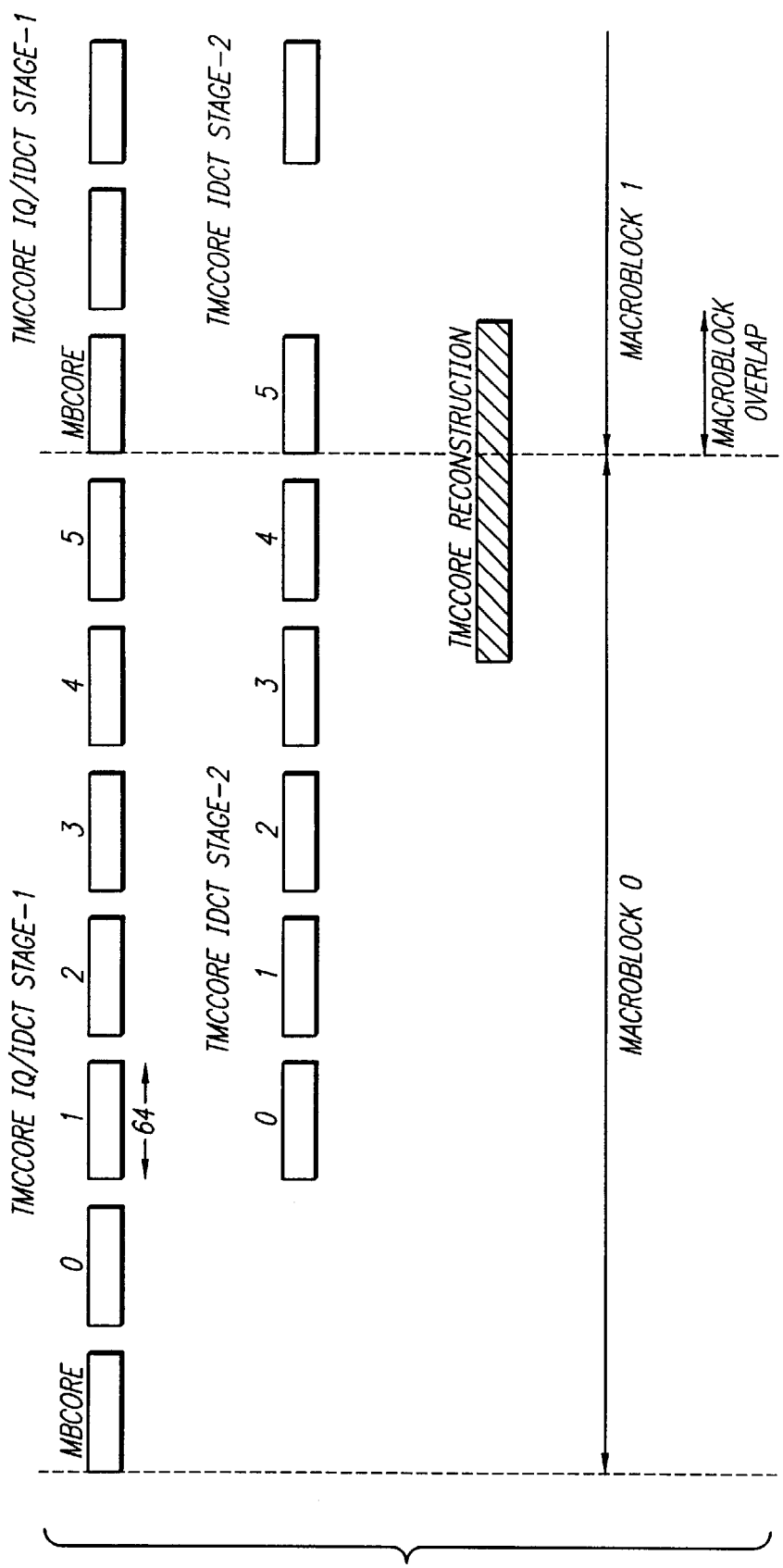
FIG. 4 shows the staggered timing of data transmission through the TMCCORE.

FIG. 4 shows the MBCORE/TMCCORE macroblock decoding overlap scheme. Again, header data is received by the MBCORE 102, followed by zero block data, which are passed to IQ/IDCT Stage 1 processing. TMCCORE IDCT Stage 2 subsequently processes the zero block data, at the same time IQ/IDCT Stage 1 processes one block data. The staggered processing progresses into and through the reconstruction stage. During reconstruction, the five block is received and processed in IDCT Stage 2, at which time the MBCORE begins receipt of data from the subsequent macroblock. Five block and picture reconstruction completes, at which time zero block for the subsequent macroblock is commencing processing within IQ/IDCT Stage 1. This is the beneficial effect of overlapping processing.

In order to perform full merged store processing, wherein the IDCT data and the motion vector data is merged within the TMCCORE 103, both sets of data must be synchronized during reconstruction. From the drawing of FIG. 4, the motion vector data is received at the same time the IDCT Stage 2 data is received and processed. The sum of the IDCT Stage 2 data and the motion vector data establishes the picture during reconstruction, and that picture is then transmitted from the TMCCORE 103.

The total number of cycles required to decode the video bitstream from the slice header and ship out six blocks of coefficients is 429 cycles. The TMCCORE IDCT Stage 2 and Reconstruction takes fewer cycles than the MBCORE parsing and shipping of data. With the staggered processing arrangement illustrated above, the MPEG video processor illustrated here can decode the bitstream in 429 cycles (worst case).

From the requirements outlined above for the letterbox format and two frame store, the minimum frequency at which the MBCORE 102 and the TMCCORE 103 must operate at to achieve real time video bitstream decoding is 1/8.465 microseconds /429 cycles, or 50.67 Mhz. Thus by overlapping the decoding of the macroblocks using the invention disclosed herein, the MBCORE and the TMCCORE together can perform MPEG-2 MP/ML decoding with a two frame store architecture and letterbox decoding with a clock running at 54 Mhz.

Video Bitstream Symbol Extractor/Data Steering Logic

The decoder of FIG. 1 must have the ability to decode a VLD (variable length DCT) in every clock cycle. The MBCORE 102 receives one DCT coefficient per cycle, and comprises in addition to an inverse DCT function a video bitstream symbol extractor 105. Data in the bitstream is compressed, and thus the MBCORE 102 must extract the necessary symbols from the bitstream, which may vary in size. The largest symbol which must be extracted is 32 bits according to the MPEG standard. The data steering logic or the video bitstream symbol extractor permits enables the BCORE 102 to read the symbols irrespective of symbol size.

Figure 5A:
FIG. 5A illustrates the data blocks received by the MBCORE.

The MBCORE 102 receives compressed video data in a linear fashion as illustrated in FIG. 5A. W0,0 represents Word 0, bit 0, while W1,31 represents Word 1, bit 31, and so forth. Time progresses from left to right, and thus the data bitstream enters the video decoder from left to right in a sequential manner as illustrated in FIG. 5A. As parsing is performed, compressed data consumed by the system is flushed out of the register and new data is shifted into the register. This flushing of consumed data and maintenance of unconsumed data is performed by the data steering logic.

Figure 5B:
FIG. 5B shows the data blocks received by the MBCORE after 16 bits of data have been transmitted to the system.

FIG. 5B illustrates the appearance of the data after a 16 bit symbol is consumed. The data comprising W0,0 . . . 15 is consumed by the system, leaving all other data behind. The problem which arises is that upon consuming a 16 bit symbol, the next symbol may be 30 bits in length, thereby requiring excess storage beyond the 32 bit single word length. The tradeoff between timing and space taken by performing this shifting function is addressed by the data steering logic.

Figure 6:
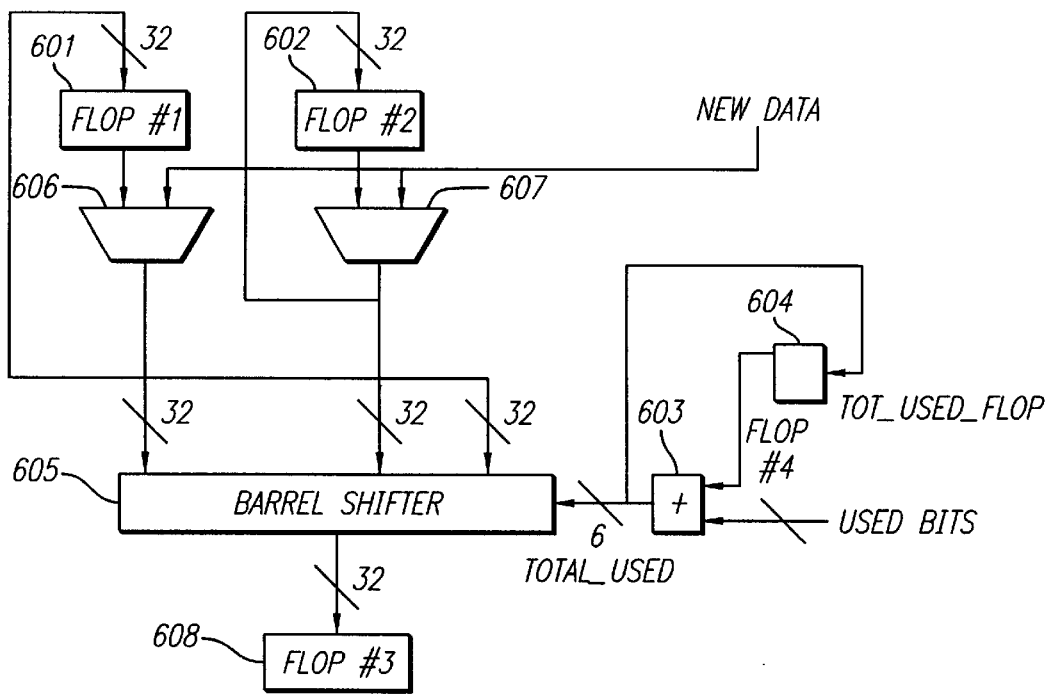
FIG. 6 shows the hardware implementation of the Data Steering Logic.

Data steering logic is presented in FIG. 6. According to the data steering logic, the CPU first instructs the data steering logic to initiate data steering. Upon receiving this initiation signal, the data steering logic loads 32 bit first flop 601 and 32 bit second flop 602 with 64 bits of data. The data steering logic then resets the total_used_bits counter 603 to zero and indicates that initialization is complete by issuing an initialization ready signal to the CPU.

Once the MBCORE 102 begins receiving video data, state machines 106 within the MBCORE 102 examine the value coming across the data bus and consume some of the bits. This value is called "usedbits" and is a six bit ([5:0]) bus. The total number of used bits, total_used[5:0], is the sum of total_used_bits[5:0] and usedbits[5:0]. total_used_bits are illustrated in FIG. 6 as flop 604. Bit usage via flop 604 and total_used_bits counter 603 is a side loop used to track the status of the other flops and barrel shifter 605.

Data is sequentially read by the system and passed to the barrel shifter, and subsequently passed to resultant data flop 608.

For example, the initial value of usedbits is 0. A consumption of 10 bits, representing a 10 bit symbol, by the state machines 106 yields a total_used_bits of 10. Hence the total_used is 10. These 10 bits are processed using first flop bank MUX 606 and loaded into barrel shifter 605.

total_used is a six bit wide bus. The range of values that may be stored using total_used is from 0 to 63. When the value of total_used_bits is greater than 63, the value of total_used_bits wraps back around to zero.

When total_used is greater than 32 and less than or equal to 63, first flop bank 601 is loaded with new data. When total_used is greater than or equal to zero and less than 32, the data steering logic loads second flop bank 602 with data.

Continuing with the previous example, the first 10 bit symbol is processed by first flop bank MUX 606 and loaded into barrel shifter 605, usedbits set to 10, total_used set to 10, and total_bits_used set to 10. The next symbol may take 12 bits, in which case the system processes the 12 bit symbol using first flop bank MUX 606 and passes the data to barrel shifter 605. usedbits is set to 12, which is added to total_used_bits (10) in total_used_bits counter 603, yielding a total_used of 22.

The next data acquired from RAM may be a large symbol, having 32 bits of length. Such a symbol spans both first flop 601 and second flop 602, from location 23 in first flop 601 through second flop 602 location 13. In such a situation, usedbits is 32, and the data is processed by first flop bank MUX 606 and second flop bank MUX 607. usedbits is set to 32, which is added to total_used_bits (22) in total_used_bits counter 603, yielding a total_used of 54.

With a total_used of 54, the system loads new data into first flop 601 and continues with second flop 602.

Barrel shifter 605 is a 32 bit register, and thus the addition of the last 32 bit segment of processed data would fill the barrel shifter 605. Hence the data from barrel shifter 605 is transferred out of barrel shifter 605 and into resultant data flop 608. The 32 bits from first flop bank MUX 606 and second flop bank MUX 607 pass to barrel shifter 605.

Continuing with the example, the next symbol may only take up one bit. In such a situation, used bits is one, which is added to total_used_bits (54) yielding a total_used of 55. The system processes the bit in second flop bank MUX 607 and the processed bit passes to barrel shifter 605.

The next symbol may again be 32 in length, in which case data from the end of second flop 602 and the beginning of first flop 601 is processed and passed into the barrel shifter 605. usedbits is 32, which is added to total_used_bits (54), which sums to 87. However, the six bit size of the total_used indicates a total of 23, i.e. the pointer in the barrel register 605 is beyond the current 64 bits of data and is 23 bits into the next 64 bits of data.

With a value in excess of 32 bits, the single bit residing in barrel shifter 605 passes to resultant data flop 608, and the 32 bits pass to barrel shifter 605. The system then sequentially steps through all remaining data to process and pass data in an efficient manner.

Figure 7:
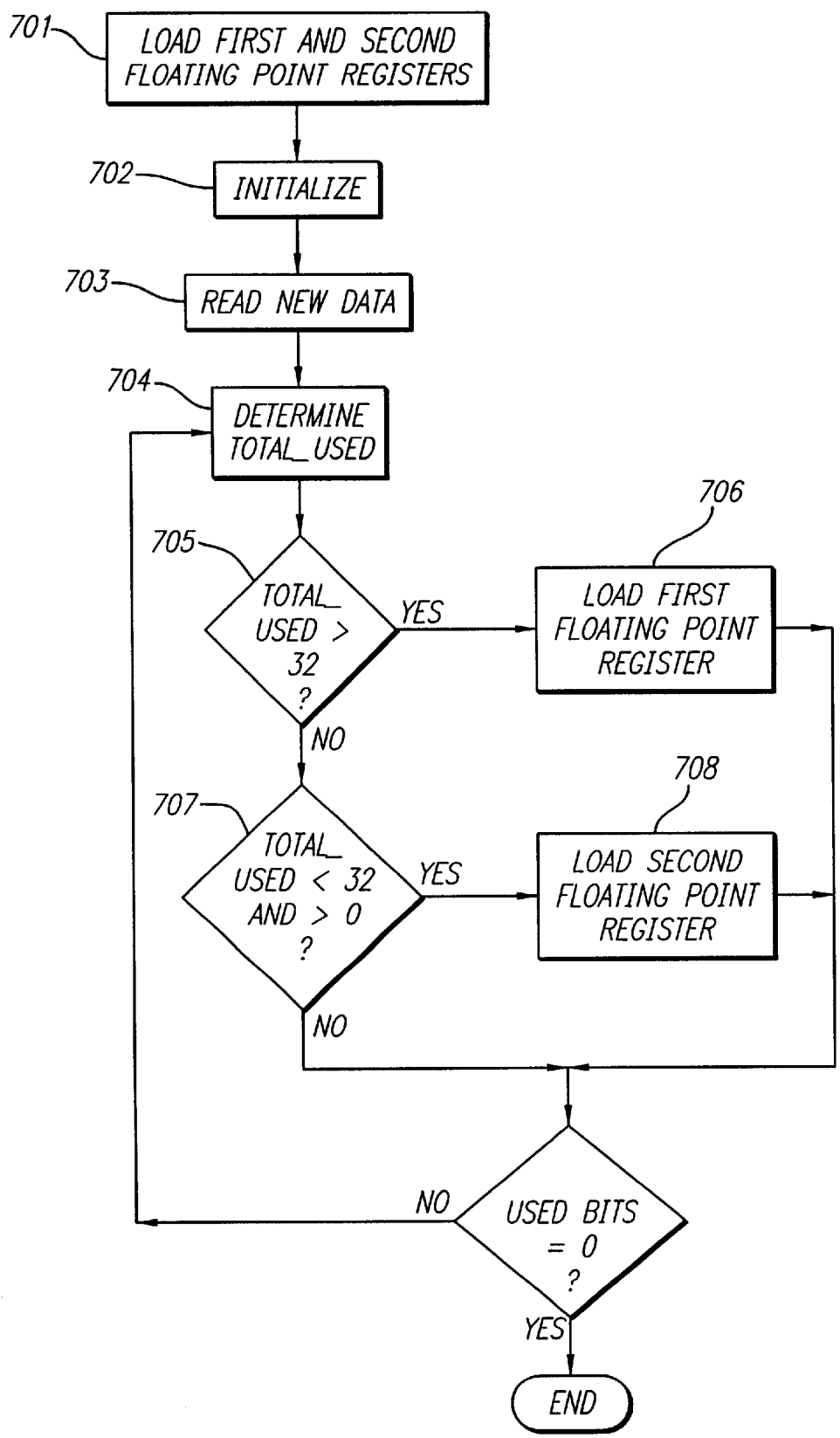
FIG. 7 is a flowchart illustrating operation of the Data Steering Logic.

The operation of the process is illustrated graphically in FIG. 7. The first and second flop banks are loaded in step 701 and the system initialized in step 702. The system reads data in step 703 and determines total_used in step 704. The system then determines whether total_used_bits is greater than 32 in step 705, and, if so, first flop bank is loaded with new data in step 706. Step 707 determines whether total_used is greater than or equal to 0 and less than 32. If so, step 708 loads the second flop bank with data.

As long as usedbits is not equal to zero, steps 704 through 708 are repeated. If the CPU initializes the data steering logic in the middle of the operation, the process begins at step 701.

The advantage of this implementation is that it is hardware oriented and requires no interaction from a CPU or microcontroller. Only a single shift register is used, which provides significant area savings. The system obtains the benefits of using the shift register as a circular buffer in that the system uses total bits as a pointer into the shift register and loads shifted data into the resultant data register 608.

IDCT Processor/Algorithm

The TMCCORE 103 performs the IDCT transform using IDCT processor 107. The Inverse Discrete Cosine Transform is a basic tool used in signal processing. The IDCT processor 107 used in MBCORE 102 may be any form of general purpose tool which performs the IDCT function, but the preferred embodiment of such a design is presented in this section.

The application of the IDCT function described in this section is within a real time, high throughput multimedia digital signal processing chip, but alternate implementations can employ the features and functions presented herein to perform the inverse DCT function.

The implementation disclosed herein is IEEE compliant, and conforms with IEEE Draft Standard Specification for the Implementations of 8×8 Inverse Discrete Cosine Transform, P1180/D1, the entirety of which is incorporated herein by reference.

Generally, as illustrated in FIG. 1, the MBCORE 102 receives DCT data and initially processes symbols using the video bitstream symbol extractor 105 and subsequently performs the IDCT function using IDCT processor 107.

The system feeds DCT coefficients into IDCT processor 106 in a group of eight rows of eight columns. Each DCT coefficient is a 12 bit sign magnitude number with the most significant bit (MSB) being the sign bit. The IDCT processor 106 processes a macroblock comprising an 8×8 block of pixels in 64 cycles. After processing, the IDCT processor transmits a data stream of eight by eight blocks. Each output IDCT coefficient is a nine bit sign magnitude number also having the MSB as a sign bit.

The Inverse Discrete Cosine Transform is defined as:

$$x(i,j) = \frac{1}{4}\sum_{k=0}^{7}\sum_{l=0}^{7}C(k)C(l)X(k,l)\cos\left(\frac{(2i+1)k\pi}{16}\right)\cos\left(\frac{(2j+1)l\pi}{16}\right) \quad (1)$$

where i,j=0 . . . 7 is the pixel value, X(k,l), k,l=0 . . . 7 is the transformed DCT coefficient, x(i,j) is the final result, and $$C(0)=1/\sqrt{2}, \text{ and } C(i)=1, i=1, \ldots 7 \quad (2)$$

Equation 1 is mathematically equivalent to the following matrix form:

$$x=1/4(X_Q P)^t P \quad (3)$$

where $X_Q(i,j)=QQ(i,j)X(j,i)$, $QQ=Q*Q$, where Q is a matrix and QQ is the product of matrix Q with itself. P from Equation 3 is as follows:

$$P = \begin{bmatrix} 1 & 1 & 1 & 1 & 1 & 1 & 1 & 1 \\ a & r(a+1) & r(a+1) & 1 & -1 & -r(a-1) & -r(a+1) & -a \\ b & 1 & -1 & -b & -b & -1 & 1 & b \\ c & -r(c-1) & -r(c+1) & -1 & 1 & r(c+1) & r(c-1) & -c \\ 1 & -1 & -1 & 1 & 1 & -1 & -1 & 1 \\ 1 & -r(c+1) & r(c-1) & c & -c & -r(c-1) & r(c+1) & -1 \\ 1 & -b & b & -1 & -1 & b & -b & 1 \\ 1 & -r(a-1) & r(a+1) & -a & a & -r(a+1) & r(a-1) & -1 \end{bmatrix}$$

where Q is:

$$Q = I * \left[\frac{1}{\sqrt{2}} \quad \frac{1}{\sqrt{a^2+1}} \quad \frac{1}{\sqrt{b^2+1}} \quad \frac{1}{\sqrt{c^2+1}} \quad \frac{1}{\sqrt{2}} \quad \frac{1}{\sqrt{c^2+1}} \quad \frac{1}{\sqrt{b^2+1}} \quad \frac{1}{\sqrt{a^2+1}}\right]$$

and I is a unitary diagonal identity matrix, a is 5.0273, b is 2.4142, c is 1.4966, and r is 0.7071.

The matrix representation of the IDCT greatly simplifies the operation of the IDCT processor 106, since each row of the P matrix has only four distinct entries, with one entry being 1. This simplification of the number of elements in the IDCT matrix means that in performing a matrix multiplication, the system only needs three multipliers instead of eight, the total number of elements in each row.

Figure 8:
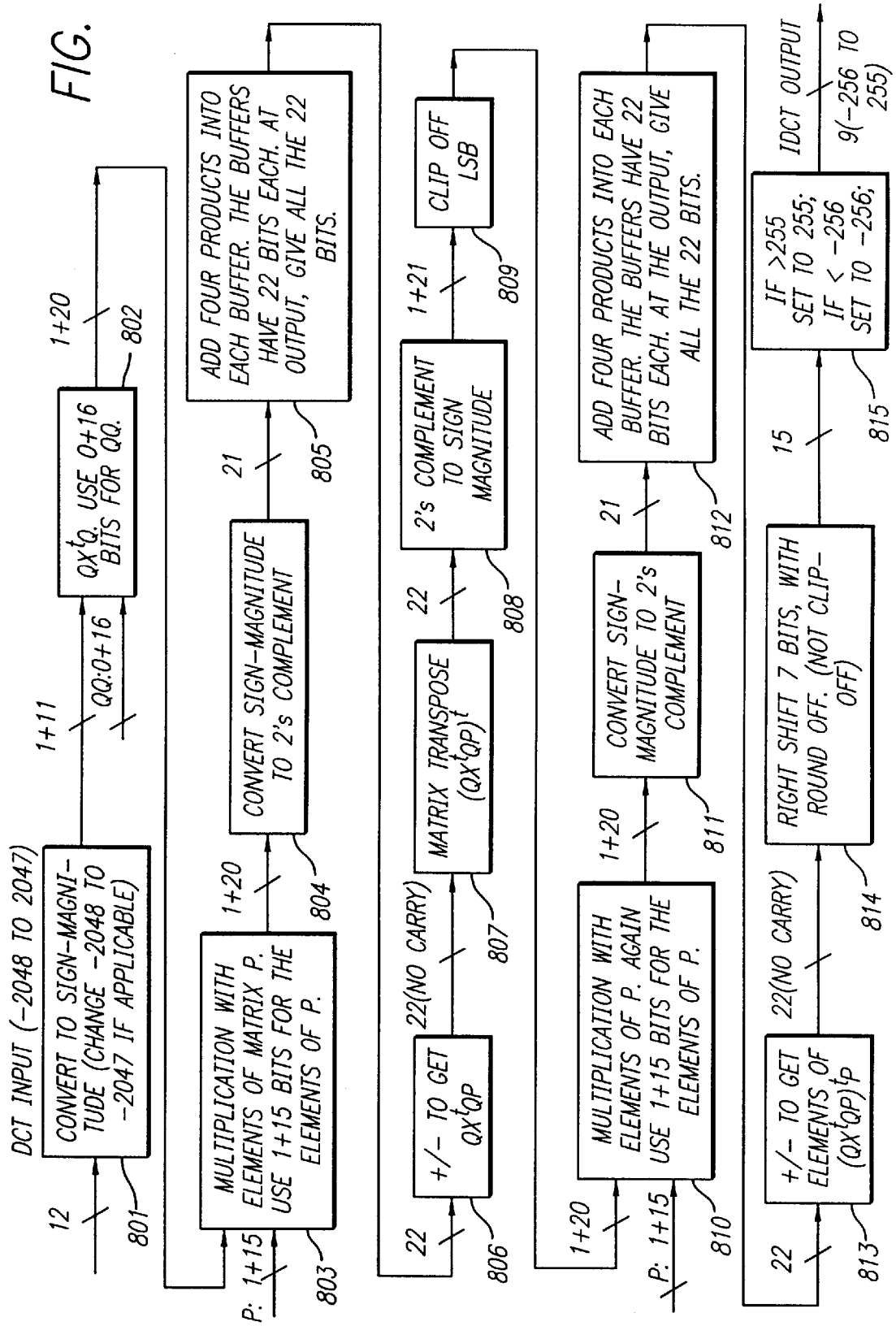
FIG. 8 is a flowchart of the DCT processor multiplication logic.

The system performs IDCT processing by performing multiplications as illustrated in FIG. 8. The IDCT processor 107 receives 12 bits of DCT data input in 2's complement format, and thus can range (with the sign bit) from −2048 to +2047. The first block 801 performs a sign change to convert to sign magnitude. If necessary, block 801 changes −2048 to −2047. This yields eleven bits of data and a data bit indicating sign. Second block 802 performs the function QX$^t$Q, which uses 0+16 bits for QQ, yielding one sign bit and 20 additional bits. Block 802 produces a 27 bit word after the multiplication (11 bits multiplied by 16 bits), and only the 20 most significant bits are retained. Block 803 multiplies the results of block 802 with the elements of the P matrix, above. The P matrix is one sign bit per element and 15 bits per element, producing a 35 bit word. The system discards the most significant bit and the 14 least significant bits, leaving a total of 20 bits. The result of block 804 is therefore again a one bit sign and a 20 data bits.

Block 805 converts the sign magnitude to two's complement, yielding a 21 bit output. The system adds four blocks into each buffer, with the buffers having 22 bits each. Block 805 transmits all 22 bits. Block 806 performs a sign change to obtain QX'QP, and passes 22 bits with no carry to block 807.

Block 807 performs a matrix transpose of QX'QP, yielding (QX'QP)'. Block 807 passes this transpose data to block 808 which performs a twos complement to sign-magnitude, yielding a one bit sign and a 21 bit word. Block 809 clips the least significant bit, producing a one bit sign and a 20 bit word. This result passes to block 810, which multiplies the result by the P matrix, having a one bit sign and a 15 bit word. The multiplication of a 20 bit word with 1 bit sign by a 15 bit word with 1 bit sign yields a 35 bit word, and the system discards the two most significant bits and the 13 least significant bits, producing a 20 bit word with a 1 bit sign out of block 810. The result of block 810 is sign-magnitude converted back to 2's complement, producing a 21 bit result in block 811. Block 812 performs a similar function to block 805, and adds the four products into each buffer. The buffers have 22 bits each, and the output from block 812 is 22 bits. This data is passed to block 813, which performs a sign switch to obtain the elements of (QX'Qp)'P. Output from block 813 is a 22 bit word, with no carry. Block 814 right shifts the data seven bits, with roundoff, and not a clipping. In other words, the data appears as follows:

SIGNxxxxxxxxxxxxxxXYxxxxxx (22 bit word)

and is transformed by a seven bit shift in block 813 to:

SIGNxxxxxxxxxxxxxxX.Yxxxxxx

Depending on the value of Y, block 814 rounds off the value to keep 15 bits. If Y is 1, block 814 increments the integer portion of the word by 1; if Y is 0, block 814 does not change the integer part of the word.

The result is a 15 bit word, which is passed to block 815. In block 815, if the 15 bit value is greater than 255, the block sets the value to 255. If the value is less than −256, it sets the value to −256. The resultant output from block 815 is the IDCT output, which is a 9 bit word from −256 to 255. This completes the transformation from a 12 bit DCT input having a value between −2048 and 2047, and a 9 bit inverse DCT output, having a value between −256 and 255.

The efficiencies for matrix multiplication are as follows. The four factors used which can fully define all elements of the QQ and P matrices are as follows:

$$f = \frac{1}{\sqrt{2}}, g = \frac{1}{\sqrt{a^2+1}}, h = \frac{1}{\sqrt{b^2+1}}, s = \frac{1}{\sqrt{c^2+1}}$$

The parameters for all elements of the QQ and PP matrix are:

$QQ_{00} = QQ_{04} = QQ_{40} = QQ_{44} = f^2 = 0.5 = 0.1000000000000000$ $QQ_{01} = QQ_{07} = QQ_{41} = QQ_{47} = fg = 0.13795 = 0.0010001101010001$ $QQ_{02} = QQ_{06} = QQ_{42} = QQ_{46} = fh = 0.270598 = 0.0100010101000110$ $QQ_{03} = QQ_{05} = QQ_{43} = QQ_{45} = fs = 0.392847 = 0.0110010010010010$ $QQ_{10} = QQ_{14} = QQ_{70} = QQ_{74} = fg = 0.13795 = 0.0010001101010001$ $QQ_{11} = QQ_{17} = QQ_{71} = QQ_{77} = g^2 = 0.0380602 = 0.0000100110111110$ $QQ_{12} = QQ_{16} = QQ_{72} = QQ_{76} = gh = 0.0746578 = 0.0001001100011101$ $QQ_{13} = QQ_{15} = QQ_{73} = QQ_{75} = gs = 0.108386 = 0.0001101110111111$ $QQ_{20} = QQ_{24} = QQ_{60} = QQ_{64} = fh = 0.270598 = 0.0100010101000110$ $QQ_{21} = QQ_{27} = QQ_{61} = QQ_{67} = gh = 0.0746578 = 0.0001101110111111$ $QQ_{22} = QQ_{26} = QQ_{62} = QQ_{66} = h^2 = 0.146447 = 0.0010010101111110$ $QQ_{23} = QQ_{25} = QQ_{63} = QQ_{65} = hs = 0.212608 = 0.0011011001101101$ $QQ_{30} = QQ_{34} = QQ_{50} = QQ_{54} = fs = 0.392847 = 0.0110010010010010$ $QQ_{31} = QQ_{37} = QQ_{51} = QQ_{57} = gs = 0.108386 = 0.0001101110111111$ $QQ_{32} = QQ_{36} = QQ_{52} = QQ_{56} = hs = 0.212608 = 0.0011011001101101$ $QQ_{33} = QQ_{35} = QQ_{53} = QQ_{55} = s^2 = 0.308658 = 0.0100111100000100$

For the P matrix,

| | | |
|---|---|---|
| 1 | = 1 | = 001000000000000 |
| a | = 5.02734 | = 101000001110000 |
| b | = 2.41421 | = 010011010100001 |
| c | = 1.49661 | = 001011111110010 |
| r(a + 1) | = 4.26197 | = 100010000110001 |
| r(a − 1) | = 2.84776 | = 010110110010001 |
| r(c − 1) | = 0.351153 | = 000010110100000 |
| r(c + 1) | = 1.76537 | = 001110001000000 |

The entire IDCT is implemented in two stages. IDCT Stage 1, illustrated in FIG. 9, implements $X_QP$. The second stage, illustrated in FIG. 10, transposes the result and multiplies it by P again.

From FIG. 2, and as may be more fully appreciated from the illustrations of FIGS. 8 through 11, the TMCCORE 103 receives the DCT input, produces the matrix $(QX^rQ)P$, or $X_QP$, in IDCT Stage 1 (i.e., from FIG. 8, completes through block 806) and stores the result in transpose RAM 923. IDCT Stage 2 performs the transpose of the result of IDCT Stage 1 and multiplies the result by P, completing the IDCT process and producing the IDCT output.

Figure 9:
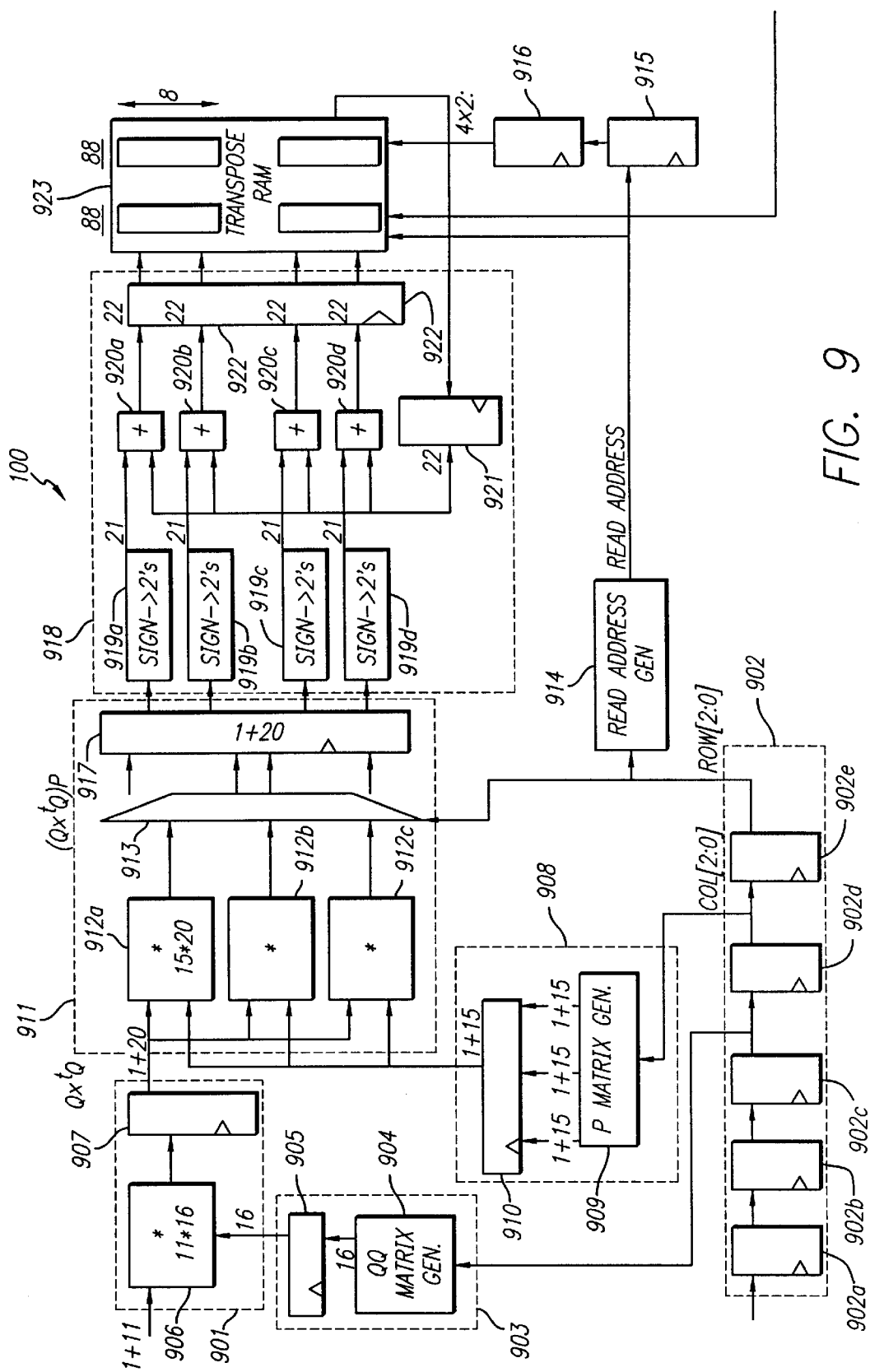
FIG. 9 illustrates the implementation of IDCT Stage 1 which functionally calculates $X_Q P$.

As may be appreciated from FIG. 9, the representation disclosed is highly similar to the flowchart of FIG. 8. From FIG. 9, IDCT Stage 1 pipeline 900 receives data from the IQ block in the form of the matrix X. The Q matrix is available from a row/column state machine in the IQ pipeline, depicted by state machine registers 902. The state machine registers 902 pass data from register 902c to QQ matrix block 903 which contains QQ matrix generator 904 and QQ matrix register 905. QQ data is passed to $QX^rQ$ block 901 which multiplies the 16 bit QQ matrix by the X block having one sign bit and 11 data bits in $QX^rQ$ multiplier 906. This multiplication is passed to $QX^rQ$ register 907, which transmits a one bit sign and a 20 bit word. $QX^rQ$ block 901 thereby performs the function of block 802. Output from register 902d is a column [2:0] which passes to P matrix block 908. P matrix block 908 comprises P matrix generator 909 which produces a sign bit and three fifteen bit words to P matrix register 910.

$QX^rQ$ block 901 passes the one bit sign and 20 bit word to $(QX^rQ)P$ block 911, which also receives the three fifteen bit words and one sign bit from P matrix block 908. $(QX^rQ)P$ block 911 performs the function illustrated in block 803 in three multiplier blocks 912a, 912b, and 912c. The results of these multiplications is passed to $(QX^rQ)P$ MUX 913, which also receives data from register 902e in the form row[2:0]. Data from register 902e also passes to read address generator 914, which produces a transpose RAM read address. The transpose RAM read address passes to transpose RAM 923 and to first write address register 915, which passes data to write address register 916. The write address from write address register 916 and the read address from read address generator 914 pass to transpose RAM 923, along with the P matrix read row/column generator state machine 1001, illustrated below. $(QX^rQ)P$ MUX 913 thus receives the output from the three multiplier blocks 912a, 912b, and 912c as well as the output from register 902e, and passes data to $(QX^rQ)P$ register 917, which passes the $(QX^rQ)P$ matrix in a one bit sign and 20 bit word therefrom. As in block 804, these four data transmissions from $(QX^rQ)P$ block 911 pass to matrix formatting block 918. Matrix formatting block 918 performs first the function illustrated in block 802 by converting sign-magnitude to two's complement in two's complement blocks 919a, 919b, 919c, and 919d. The values of these four blocks 919a–d are added to the current values held in transpose RAM 923 in summation blocks 920a, 920b, 920c, and 920d. The transpose RAM 923 value is provided via register 921. Transpose RAM 923 is made up of 4 eight bit by 88 bit values, and each 22 bit result from the four summation blocks 920a, 920b, 920c, and 920d pass to register 922 and subsequently to transpose RAM 923. This completes processing for IDCT Stage 1.

Figure 10:
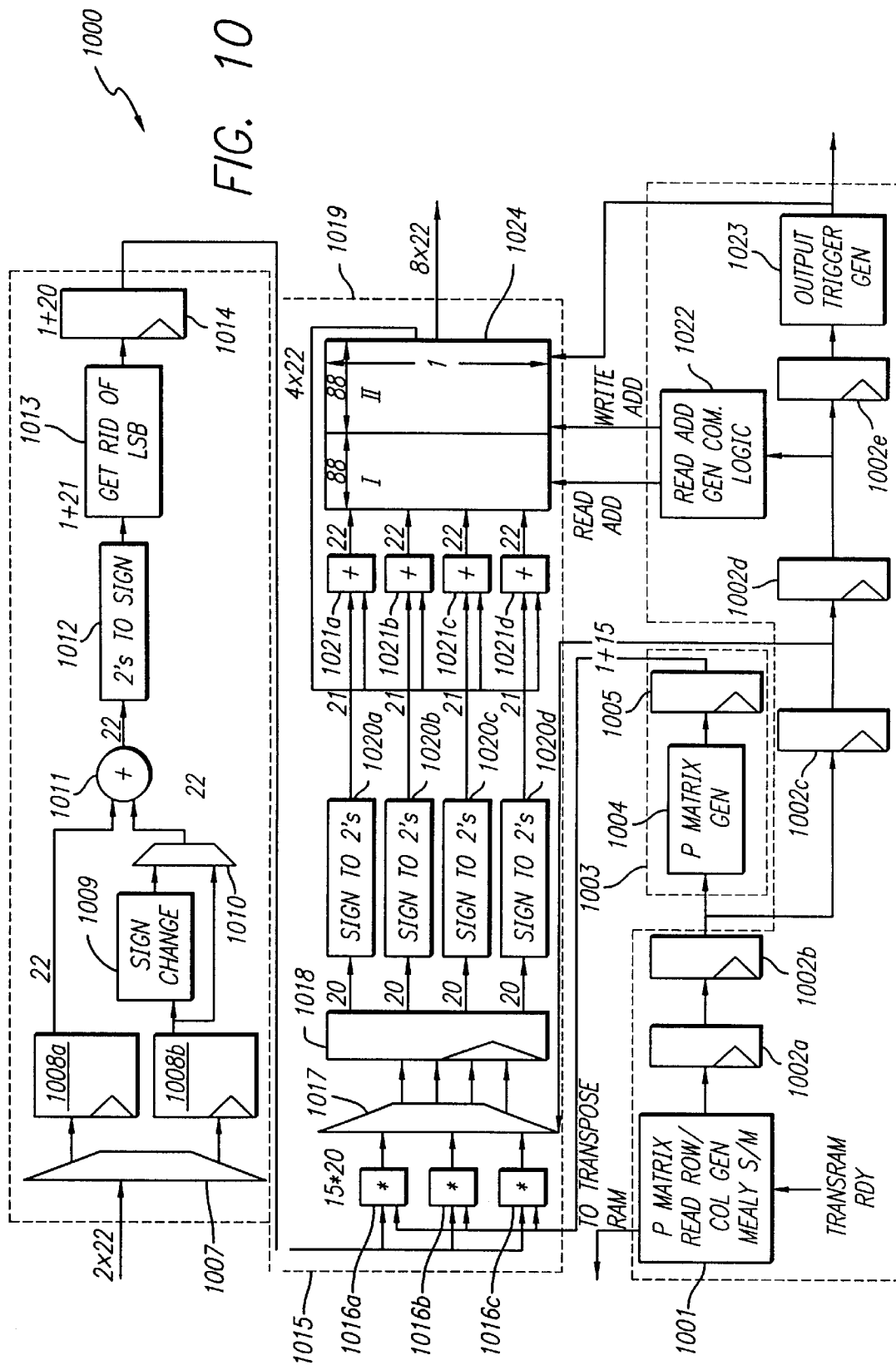
FIG. 10 is the design for IDCT stage 2, which transposes the result from IDCT Stage 1 and multiplies the resultant matrix by P.

Processing for IDCT Stage 2 1000 is illustrated in FIG. 10. P matrix read row/column generator state machine 1001 receives a transpose RAM ready indication and provides row/column information for the current state to transpose RAM 923 and to a sequence of registers 1002a, 1002b, 1002c, 1002d, and 1002e. The information from 1002b passes to Stage 2 P matrix block 1003, comprising Stage 2 P matrix generator 1004 and P matrix register 1005, which yields the one bit sign and 15 bit word for the P matrix.

From transpose RAM 923, two of the 22 bit transpose RAM elements pass to transpose block 1006, wherein transpose MUX 1007 passes data to registers 1008a and 1008b, changes the sign from one register using sign change element 1009 and passes this changed sign with the original value from register 1008b through MUX 1010. The value from MUX 1010 is summed with the value held in register 1008a in summer 1011, which yields the transpose of $QX^rQP$, a 22 bit word. Thus the value of the data passing from the output of summer 1011 is functionally equal to the value from block 807, i.e. $(QX^rQP)^r$. Two's complement/sign block 1012 performs the function of block 808, forming the two's complement to sign-magnitude. The LSB is clipped from the value in LSB clipping block 1013, and this clipped value is passed to register 1014, having a one bit sign and a 20 bit word.

The output from transpose block 1006 is multiplied by the P matrix as functionally illustrated in block 810. This multiplication occurs in Stage 2 P multiplication block 1015, specifically in multipliers 1016a, 1016b, and 1016c. This is summed with the output of register 1002c in MUX 1017 and passed to register 1018. This is a matrix multiplication which yields $(QX^rQP)^rP$. Conversion block 1019 converts this information, combines it with specific logic and stores the IDCT values. First two's blocks 1020a, 1020b, 1020c, and 1020d convert sign-magnitude to two's complement, as in block 811, and sum this in adders 1021a, 1021b, 1021c, and 1021d with current IDCT RAM 1024 values, which comprise four 22 bit words. The sum of the current IDCT RAM values and the corrected $(QX^rQP)^rP$ values summed in adders 1021a–d pass to IDCT RAM 1024.

IDCT RAM 1024 differs from transpose RAM 923. IDCT RAM 1024 provides a hold and store place for the output of IDCT Stage 2 values, and comprises two 88 by 1 registers. Note that IDCT RAM 1024 feeds four 22 bit words back to adders 1021a–d, one word to each adder, and passes eight 22 bit words from IDCT Stage 2 1000.

RAM also utilizes values passed from register 1002d, i.e. the position of read/write elements or the state of the multiplication. Register 1002d passes data to read additional combined logic element 1022, which calculates and passes a read add indication and a write add indication to RAM to properly read and write data from adders 1021a–d.

Data also passes from register 1002d to register 1002e, which provides information to output trigger generator 1023, the result of which is passed to RAM as well as out of IDCT Stage 2 1000. The output from RAM is eight 22 bit words and the output from output trigger generator 1023. The result functionally corresponds to the output from block 812.

Figure 11:
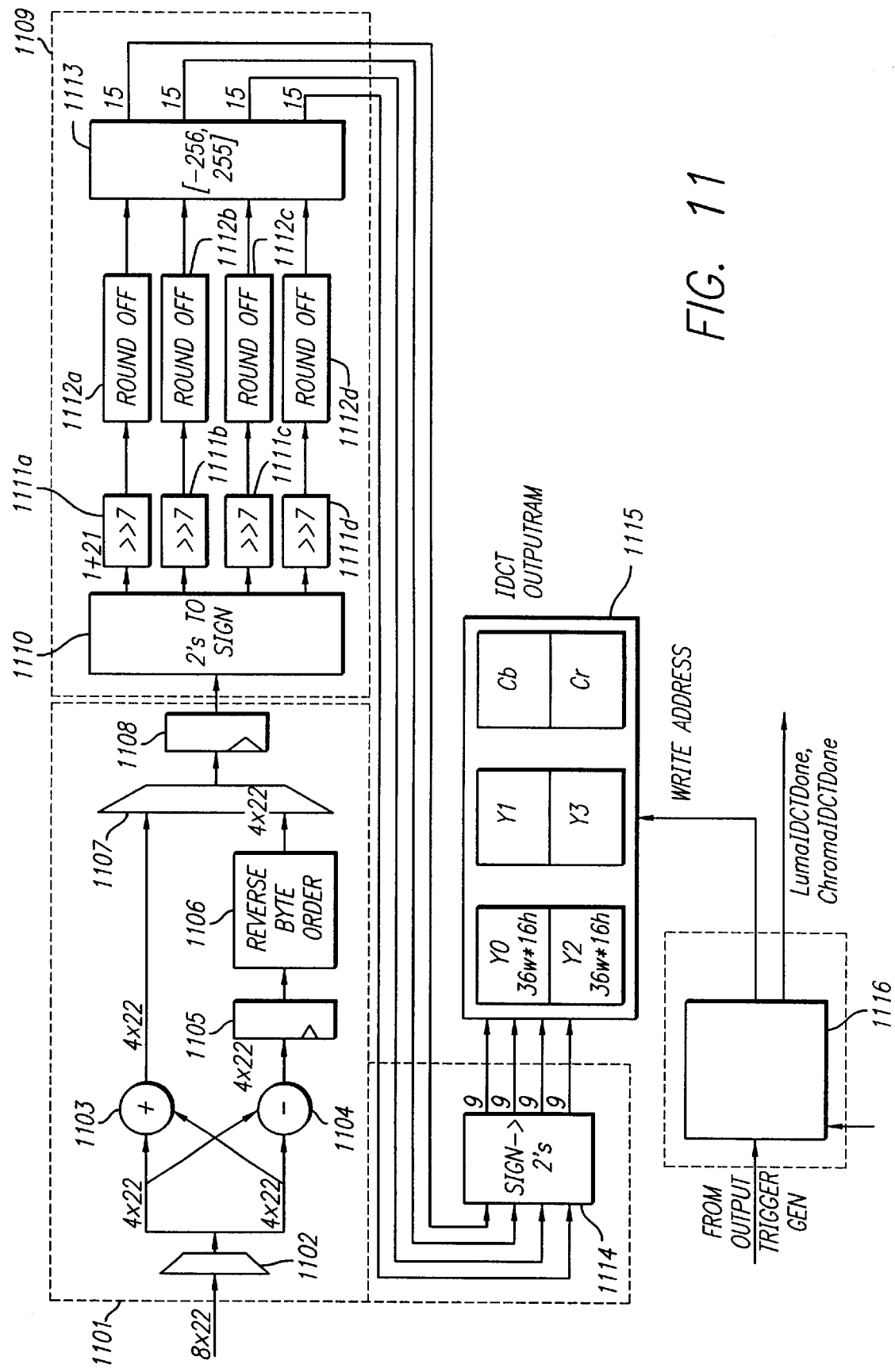
FIG. 11 shows the system design for performing the final functions necessary for IDCT output and storing the values in appropriate positions in IDCT OUTPUT RAM.

FIG. 11 illustrates the implementation which performs the final functions necessary for IDCT output and stores the values in appropriate positions in IDCT OUTPUT RAM 1115. Sign corrector 1101 receives the eight 22 bit words from IDCT Stage 2 1000 and multiplexes them using MUX 1102 to four 22 bit words passing across two lines. These values are summed in summer 1103, and subtracted in subtractor 1104 as illustrated in FIG. 11. The output from subtractor 1104 passes through register 1105 and reverse byte orderer 1107, and this set of 4 22 bit words passes along with the value from summer 1103 to MUX 1107, which passes data to register 1108. This sign corrector block produces an output functionally comparable to the output of block 813, essentially providing the elements of $(QX^rQP)^rP$. Shift/roundoff block 1109 takes the results from sign corrector 1101, converts two's complement to sign/magnitude in element 1110, shifts the value right seven places using shifters 1111*a*, 1111*b*, 1111*c*, and 1111*d*, rounds these values off using round off elements 1112*a*, 1112*b*, 1112*c*, and 1112*d*, and passes these to element 1113. The rounded off values from round off elements 1112*a–d* functionally correspond to the output from block 814. The value is limited between −256 and +255 in element 1113, the output of which is a 15 bit word passed to sign block 1114, which performs a conversion to two's complement and passes four nine bit words to IDCT OUTPUT RAM 1115.

Output from the Output Trigger Generator and the chroma/luma values from CBP Luma/Chroma determine the stage of completeness of the IDCT RAM OUTPUT. IDCT RAM address/IDCT Done indication generator 1116, as with elements 914, 915, and 916, as well as elements 1022 and 1023, are placekeepers or pointers used to keep track of the position of the various levels of RAM, including the current position and the completion of the individual tasks for various levels of processing, i.e. IDCT Stage 1 progress, IDCT Stage 2 progress, and completion of the Stages. It is recognized that any type of bookkeeping, maintenance, or pointing processing can generally maintain values and placement information for reading, writing, and providing current location and completion of task indications to blocks or elements within the system while still within the scope of the current invention. The purpose of these elements is to provide such a bookkeeping function.

IDCT RAM address/IDCT Done indication generator 1116 receives output trigger generator 1023 output trigger information and CBP Luma/Chroma indications and provides a write address and a Luma Done/Chroma Done IDCT indication, signifying, when appropriate, the receipt of all necessary luma/chroma values for the current macroblock.

The system writes IDCT information to IDCT OUTPUT RAM 1115, specifically the information passing from sign block 1114 to the appropriate location based on the write address received from IDCT RAM address/IDCT Done indication generator 1116. IDCT OUTPUT RAM 1115 is broken into Luma (Y0, Y1, Y2, and Y3) locations, and Chroma (Cb and Cr) locations. The values of IDCT OUTPUT RAM 1115 represent the complete and final IDCT outputs.

The design disclosed herein provides IDCT values at the rate of 64 cycles per second. The design stores two blocks worth of data in transpose RAM 923 between IDCT Stage 1 and IDCT Stage 2.

Motion Compensation

Motion compensation for the two frame store and letterbox scaling for MPEG decoding operates as follows.

Figure 12:
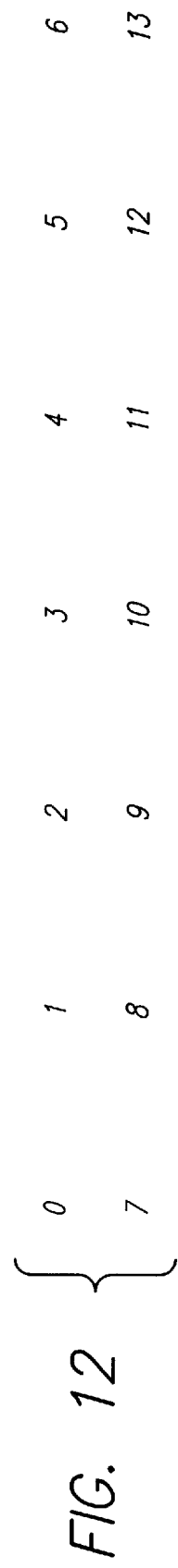
FIG. 12 represents the numbering of pels for use in motion compensation.

For a 2×7 array of pixels, i.e. 14 pels, the numbering of pels is illustrated in FIG. 12.

The system performs a half-pel compensation. Half-pel compensation is compensating for a location between pixels, i.e. the motion is between pixel x and pixel y. When the system determines the data in FIG. 12 must be right half pel compensated, or shifted right one half pel, the system performs the operation(s) outlined below.

$$0'=(0+1)/2; \text{ if } (0+1) \bmod 2==1, 0'=0'+1;$$

$$1'=(1+2)/2; \text{ if } (1+2) \bmod 2==1, 1'=1'+1;$$

. . .

$$5'=(5+6)/2; \text{ if } (5+6) \bmod 2==1, 5'=5'+1.$$

When the system determines the data in FIG. 12 must be down half pel compensated, or shifted downward one half pel, the system performs the operation(s) outlined below.

$$0'=(0+7)/2; \text{ if } (0+7) \bmod 2==1, 0'=0'+1;$$

$$1'=(1+8)/2; \text{ if } (1+8) \bmod 2==1, 1'=1'+1;$$

. . .

$$6'=(6+13)/2; \text{ if } (6+13) \bmod 2==1, 6'=6'+1.$$

Alternately, the system may indicate the desired position is between four pels, or shifted horizontally one half pel and down one half pel. When the system determines the data in FIG. 12 must be right and down half pel compensated, or shifted right one half pel and down one half pel, the system performs the operation(s) outlined below.

$$0'=(0+1+7+8)/4; \text{ if } (0+1+7+8) \bmod 4==1, 0'=0'+1;$$

$$1'=(1+2+8+9)/2; \text{ if } (1+2+8+9) \bmod 4==1, 1'=1'+1.$$

Figure 13:
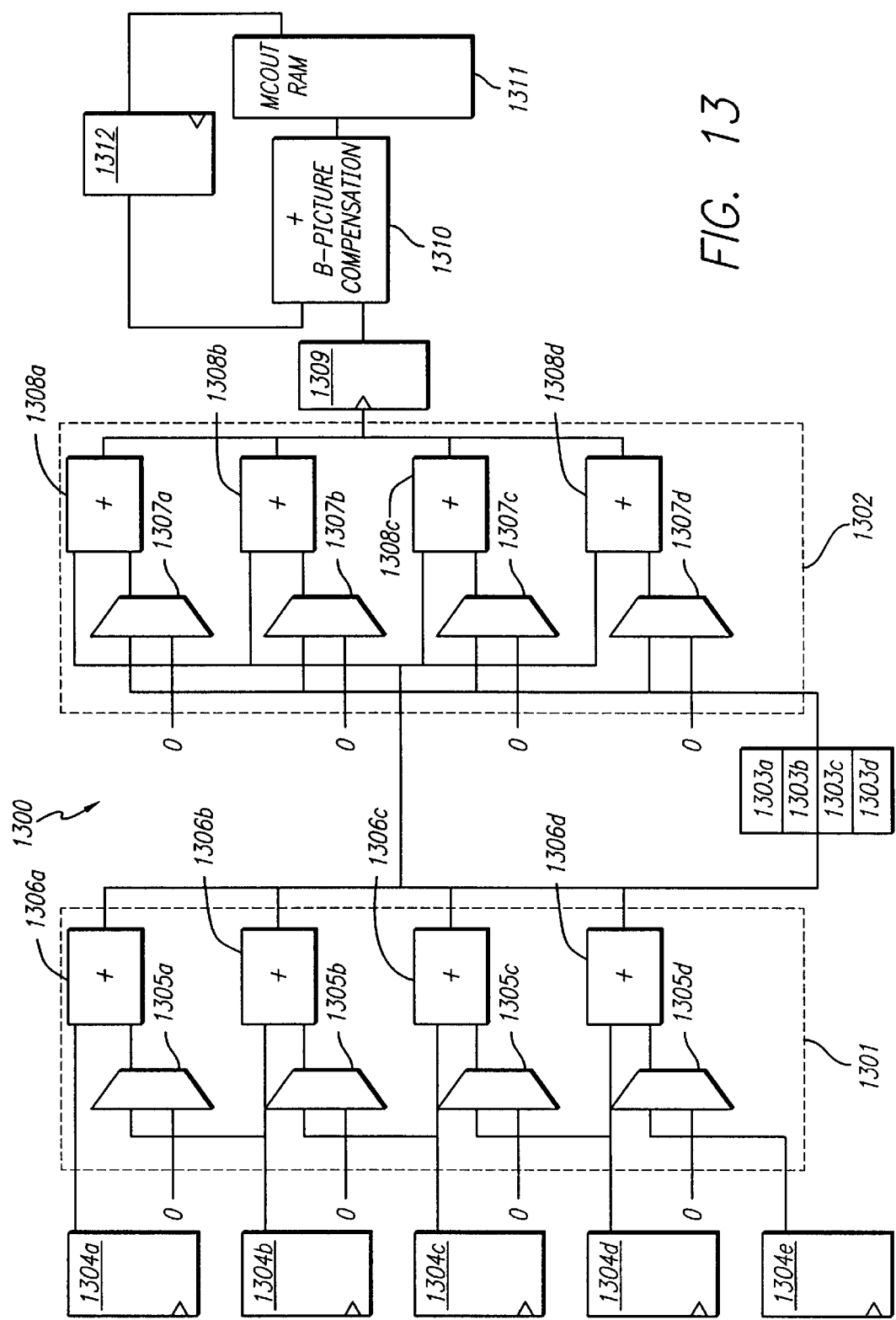
FIG. 13 is the mechanization of the motion compensation unit used to satisfy two frame store and letterboxing requirements.

The aforementioned logic is implemented as illustrated in FIG. 13. As may be appreciated, a right half pel shift may require the system to point to a position one half-pel outside the block. Thus the system must compensate for odd-pel shifting.

From FIG. 13, the motion compensation unit 1300 comprises horizontal half pel compensatory 1301 and vertical half pel compensator 1302, as well as four banks of 36 flops 1303*a*, 1303*b*, 303*c*, and 1303*d*. Registers 1304*a*, 1304*b*, 1304*c*, 1304*d*, and 1304*e* contain motion compensation data having 32 bits of information. These registers pass the motion compensation data to horizontal compensation MUXes 1305*a*, 1305*b*, 1305*c*, and 1305*d*, as well as horizontal adders 1306*a*, 1306*b*, 1306*c*, and 1306*d* as illustrated in FIG. 13. For example, register 1304*e* passes motion compensation data to horizontal compensation MUX 1305*d*, which subsequently passes the information to horizontal adder 1306*d* and adds this value to the value received from register 1304*d*. Register 1304*a* passes data to adder 1306*a* but does not pass data to any of the horizontal compensation MUXes 1305*a–d*. This summation/MUX arrangement provides a means for carrying out the right half-pel compensation operations outlined above. The result of the horizontal half pel compensator 1301 is four summed values corresponding to the shift of data one half pel to the right for a row of data.

As a luma macroblock has dimensions of 16×16, movement of one half pel to the right produces, for the 16th element of a row, a shift outside the bounds of the 16×16 macroblock. Hence a right shift produces a 16×17 pixel macroblock, a vertical shift a 17×16 pixel macroblock, and a horizontal and vertical shift a 17 by 17 pixel macroblock. The additional space is called an odd pel.

The compensation scheme illustrated in FIG. 13 determines the necessity of compensation and thereby instructs the MUXes disclosed therein to compensate by adding one half pel to each pel position in the case of horizontal pixel compensation. Thus out of the 32 bits from reference logic, data for each pel may be shifted right one pel using the MUX/adder arrangement of the horizontal half pel compensator 1301.

Vertical pel compensation operates in the same manner. For each of the pels in a macroblock, the data is shifted downward one half pel according to the vertical compensation scheme outlined above. Vertical half pel compensator 1302 takes and sums results from the horizontal half pel compensator 1301 and receives data from the four banks of 36 flops 1303*a*, 1303*b*, 1303*c*, and 1303*d*. Data from horizontal half pel compensator 1301 passes to vertical adders 1308*a*, 1308*b*, 1308*c*, and 1308*d* along with MUXed data from the four banks of 36 flops 1303*a*, 1303*b*, 1303*c*, and 1303*d*.

In cases where vertical and horizontal half pel compensation are required, the four banks of 36 flops 1303a, 1303b, 1303c, and 1303d are used by the system to store the extra row of reference data expected for down half-pel compensation. This data storage in the four banks of 36 flops 1303a–d provides the capability to perform the computations illustrated above to vertically and horizontally shift the data one half pel. The result is transmitted to register 1309, which may then be B-picture compensated and transmitted to motion compensation output RAM 1311.

Reference data averaging may be necessary for B-pictures having backward and forward motion vectors, or with P pictures having a dual-prime prediction. Either function is accomplished within the B-picture compensator 1310.

Prediction may generally be either frame prediction, field prediction, or dual-prime. Frame pictures for half pel compensation appear as follows.

In frame prediction, the luma reference data pointed to by a motion vector contains either 16×16 (unshifted), 16×17 (right half-pel shifted), 17×16 (down half-pel shifted), or 17×17 (right and down half-pel shifted) data. The chroma component, either Cr or Cb, contains either 8×8 (unshifted), 8×9 (right half-pel shifted), 9×8 (down half-pel shifted) or 9×9 (right and down half-pel shifted) data.

In field prediction as well as dual-prime predictions, the luma reference data pointed to by a motion vector contains either 8×16 (unshifted), 8×17 (right half-pel shifted), 9×16 (down half-pel shifted) or 9×17 (down and right half pel shifted) data. The chroma reference data, either Cr or Cb, contains either 4×8 (unshifted), 4×9 (right half-pel shifted), 5×8 (down half-pel shifted) or 5×9 (right and down half-pel shifted) data.

Field pictures for half-pel compensation may utilize field prediction, 16×8 prediction, or dual-prime. Field prediction and dual-prime prediction are identical to frame prediction in frame pictures, i.e. the luma and chroma references are as outlined above with respect to frame prediction (16×16, 16×17, 17×16, or 17×17 luma, 8×8, 8×9, 9×8, or 9×9 chroma). 16×8 prediction is identical to field prediction in frame pictures, i.e., luma and chroma are identical as outlined above with respect to field prediction (8×16, 8×17, 9×16, or 9×17 luma, 4×8, 4×9, 5×8, or 5×9 chroma).

The motion compensation unit 1300 accepts reference data 32 bits (4 pels) at a time while accepting odd pel data one pel at a time on the odd pel interface, The system ships luma reference data in units of 8×16 and chroma reference data in units of 4× 8. Luma reference data is transferred before chroma reference data, and Cb chroma is shipped before Cr chroma.

In accordance with the motion compensation unit 1300 of FIG. 13, transfer of luma and chroma data occurs as follows.

For luma data, assuming that luma reference data is represented by luma [8:0] [16:0], or that data requires both right and down half-pel compensation. On a cycle by cycle basis, luma data is transferred as follows using motion compensation unit 1300:

| Cycle | Reference Data | Odd-Pel Data |
| --- | --- | --- |
| 1 | Luma [0] [12:15] | Luma [0] [17] |
| 2 | Luma [0] [8:11] | |
| 3 | Luma [0] [4:7] | |
| 4 | Luma [0] [0:3] | |
| 5 | Luma [1] [12:15] | Luma [1] [16] |
| 6 | Luma [1] [8:11] | |
| 7 | Luma [1] [4:7] | |

-continued

| Cycle | Reference Data | Odd-Pel Data |
| --- | --- | --- |
| 8 | Luma [1] [0:3] | |
| ... | ... | ... |
| 33 | Luma [8] [12:15] | Luma [8] [16] |
| 34 | Luma [8] [8:11] | |
| 35 | Luma [8] [4:7] | |
| 36 | Luma [8] [0:3] | |

For chroma reference data represented by Chroma [4:0] [8:0].

The motion compensation unit 1300 transfers data on a cycle by cycle basis as follows:

| Cycle | Reference Data | Odd-Pel Data |
| --- | --- | --- |
| 1 | Chroma [0] [4:7] | Chroma [0] 8 8] |
| 2 | Chroma [0] [0:3] | |
| 3 | Chroma [1] [4:7] | Chroma [1] [8] |
| 4 | Chroma [1] [0:3] | |
| ... | ... | ... |
| 9 | Chroma [4] [4:7] | Chroma [4] [8] |
| 10 | Chroma [4] [0:3] | |

Data expected by motion compensation units for the combinations of picture type, prediction type, and pel compensation are as follows:

| Picture Type | Prediction Type | Pel Compensation | Data fetched by vector (in pels) Luma/Chroma |
| --- | --- | --- | --- |
| Frame | Frame | None | 16x16/8x8 |
| | | Right | 16x17/8x9 |
| | | Vertical | 17x16/9x8 |
| | | Right/Vert. | 17x17/9x9 |
| | Field | None | 8x16/4x8 |
| | | Right | 8x17/4x9 |
| | | Vertical | 9x16/5x8 |
| | | Right/Vert. | 9x17/5x9 |
| | Dual-Prime | None | 8x16/4x8 |
| | | Right | 8x17/4x9 |
| | | Vertical | 9x16/5x8 |
| | | Right/Vert. | 9x17/5x9 |
| Field | Field | None | 16x16/8x8 |
| | | Right | 16x17/8x9 |
| | | Vertical | 17x16/9x8 |
| | | Right/Vert. | 17x17/9x9 |
| | 16 x 8 | None | 8x16/4x8 |
| | | Right | 8x17/4x9 |
| | | Vertical | 9x16/5x8 |
| | | Right/Vert. | 9x17/5x9 |
| | Dual-Prime | None | 16x16/8x8 |
| | | Right | 16x17/8x9 |
| | | Vertical | 17x16/9x8 |
| | | Right/Vert. | 17x17/9x9 |

Reference data transfer to the TMCCORE 103 occurs as follows.

| Reference Motion Vector Data | Transfer Order to Motion Compensation Unit 1300 |
| --- | --- |
| Luma Data | |
| 17x17 | 1) 9x17 |
| | 2) 8x17 |

| Reference Motion Vector Data | Transfer Order to Motion Compensation Unit 1300 |
|---|---|
| 16x16 | 1) 8x16 |
|  | 2) 8x16 |
| 17x16 | 1) 9x16 |
|  | 2) 8x16 |
| 16x17 | 1) 8x17 |
|  | 2) 8x17 |
| 8x16 | 8x16 |
| 9x16 | 9x16 |
| 8x17 | 8x17 |
| 9x17 | 9x17 |
| Chroma Data |  |
| 9x9 | 1) 5x9 |
|  | 2) 4x9 |
| 8x9 | 1) 4x9 |
|  | 2) 4x9 |
| 9x8 | 1) 5x9 |
|  | 2) 4x9 |
| 8x8 | 1) 4x8 |
|  | 2) 4x8 |
| 4x8 | 4x8 |
| 4x9 | 4x9 |
| 5x8 | 5x8 |
| 5x9 | 5x9 |

The maximum amount of reference data (in bytes) that the system must fetch for any macroblock conforming to the 4:2:0 format occurs in a frame picture/field prediction/B-picture, a field picture/16×8 prediction/B-picture, or a frame picture/dual prime. The amount of luma reference data expected, excluding odd pel data, is 4 * 9 * 16 or 576 bytes of data. The amount of luma reference data (for both Chroma blue and Chroma red, excluding half-pel data, is 2 * 4 * 5 * 8 or 320 bytes.

Data may be processed by the motion compensation unit 1300 at a rate of 4 pels per cycle. The total number of cycles required to process the data is 576+320 / 4, or 224 cycles. This does not include odd pel data which is transferred on a separate bus not shared with the main data bus.

MOTION VECTOR LOGIC SHARING AND PIPELINING

In order to implement a MPEG video decoder that can meet constraints of a 2-frame store architecture and a letterbox scaling simultaneously, it is imperative that the motion vectors be decoded in the worst case in a minimum number of cycles.

In the following sections, an architecture of a motion vector extraction scheme that minimizes logic and achieves worst case motion vector decoding in 22 cycles per macroblock is disclosed. The implementation achieves the decoding by overlapping the data extraction process or the data fetch process with the computation process.

Advantageously, the motion vector extraction and computation are performed in the least number of cycles without increasing hardware logic. The architecture requires no intervention from the CPU or microcontroller and enables 2-frame store decode with letter box scaling capability.

Motion Vector

Figure 14:
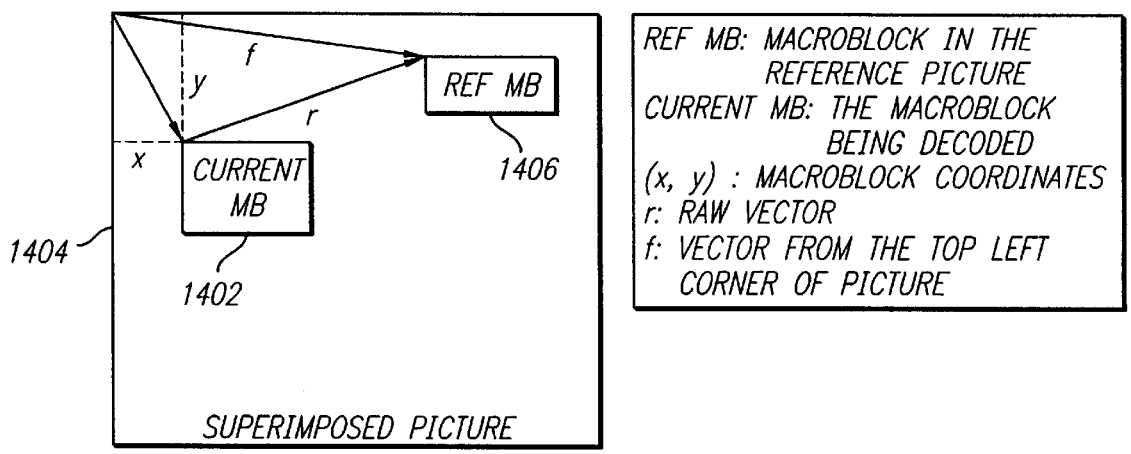
FIG. 14 is a diagram illustrating a current macroblock being decoded but in the reference picture and a motion vector r signifying a relative position of the reference macroblock with respect to the current macroblock.

In most decoding scenarios, a macroblock in a picture can be reconstructed by using information from a macroblock in a previous picture. A macro block is a 16×16 pixel area within the picture. Motion vectors encode the reference the macroblock being decoded makes to a macroblock in a previous picture. FIG. 14 illustrates this concept.

In FIG. 14, the current macroblock 1402 shows the position of the macroblock being decoded but in the reference picture 1404. The vector r is the motion vector whose head is the top left corner of the current macroblock 1402 and the tail is the top left corner of the reference macroblock 1406 in the reference picture 1404. Therefore vector r signifies a relative position of the reference macroblock 1406 with respect to the current macroblock 1402. The top left corner of the current macroblock 1402 is identified by the coordinates (x,y). The vector f is the vector pointing to the top left corner of the reference macroblock 1406 from the top left corner of the reference picture 1404. It is obtained by adding the macroblock coordinates to the vector r.

Differential Encoding of Motion Vector

In MPEG2, the motion vector for the current macroblock is encoded by taking a difference between the current motion vector and the motion vector of the previous macroblock. The difference, called delta, is then encoded using huffman encoding. This type of coding minimizes the bits required to represent motion vectors.

In order to compute motion vectors, the motion vector of the previous macroblock is added to the delta which is extracted from the compressed picture bitstream.

Flow of Motion Vector Computation

Figure 15:
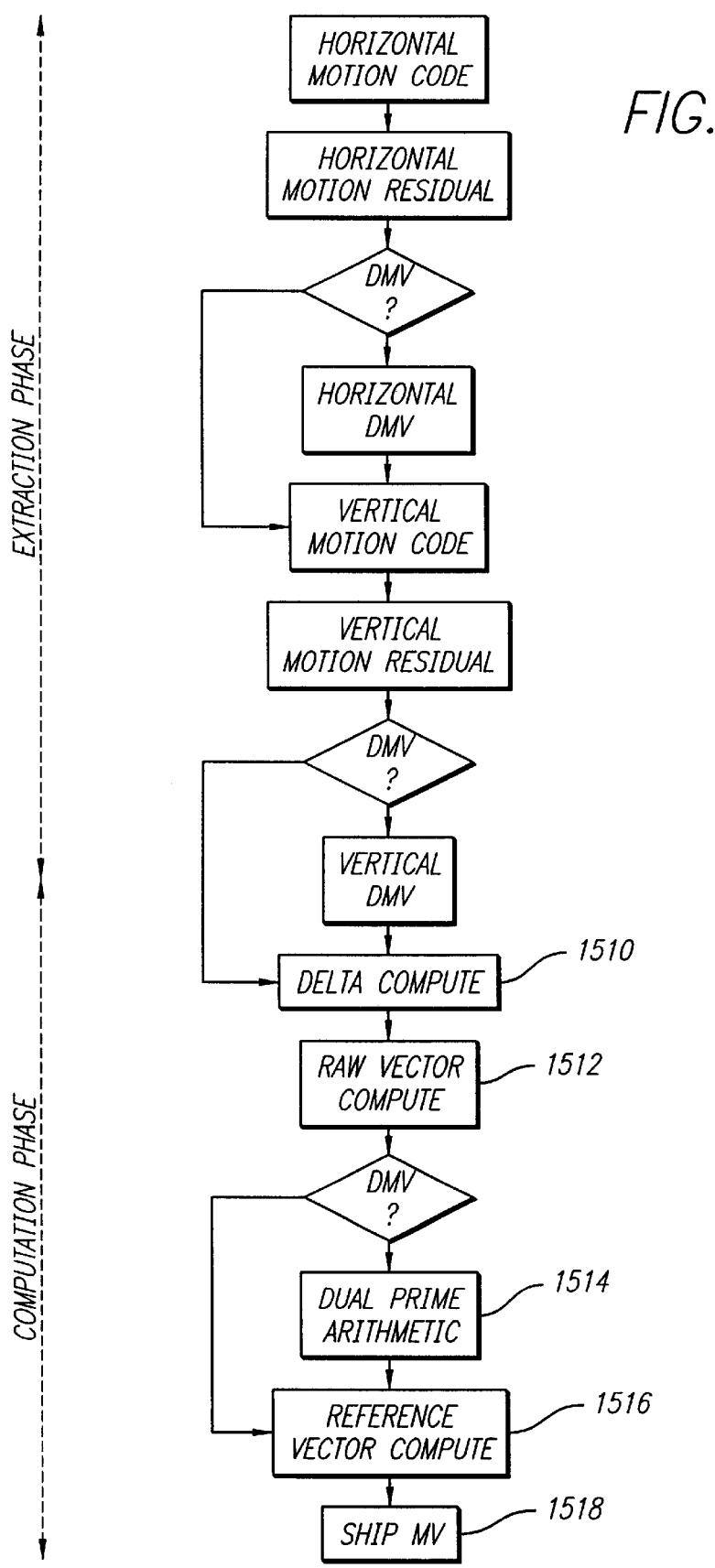
FIG. 15 is a functional flowchart showing the steps of extraction of parameters needed for the computation of motion vectors and the computation process.

FIG. 15 shows the steps of extraction of parameters needed for the computation of motion vectors and the computation process. Details of the MPEG2 terms used are set forth in ISD standards 11172 and 13818 which are incorporated herein by reference.

A macroblock may have only a forward motion vector or only a backward motion vector or motion vectors in both the directions. For each direction there may be at most 2 motion vectors referring to 2 different macroblocks in the reference picture. Therefore, there may be up to 4 motion vectors encoded in the bitstream per macroblock. FIG. 15 shows the logical flow of the extraction of the parameters needed for the calculation of motion vector, and the computation.

The parameters to be extracted, that appear serially in the following order, are horizontal motion code, horizontal motion residual, horizontal dmv for dual prime vector, vertical motion code, vertical motion residual, and vertical dmv for dual prime vector.

The computation of the motion vectors comprises:

1) delta computation phase,
2) the raw vector computation phase,
3) dual prime arithmetic for dual prime of vector, and
4) the reference vector computation.

These phases are executed for the vertical as well as the horizontal components of the motion vectors. The computation block computes the luma and the chroma vectors for the macroblock.

The delta computation phase 1510 employs the motion code, motion residual to compute the delta or differential.

The raw vector compute 1512 includes the addition of the delta with the predicted motion vector which is derived from the motion vector of the previous macroblock.

In case dual prime vectors are present, the dual prime arithmetic logic needs to be applied to the raw vector. This is done by the dual prime arithmetic phase 1514.

The reference vector compute 1516 is responsible for the computation of motion vector with respect to the top left corner of the picture. This involves vector addition of the current macroblock coordinates with the raw vector.

The ship mv logic 1518 checks whether the external logic is ready to accept the motion vector and ships the motion vector to the interface.

Pipelined Implementation of the Motion Vector Decode Process

Figure 16:
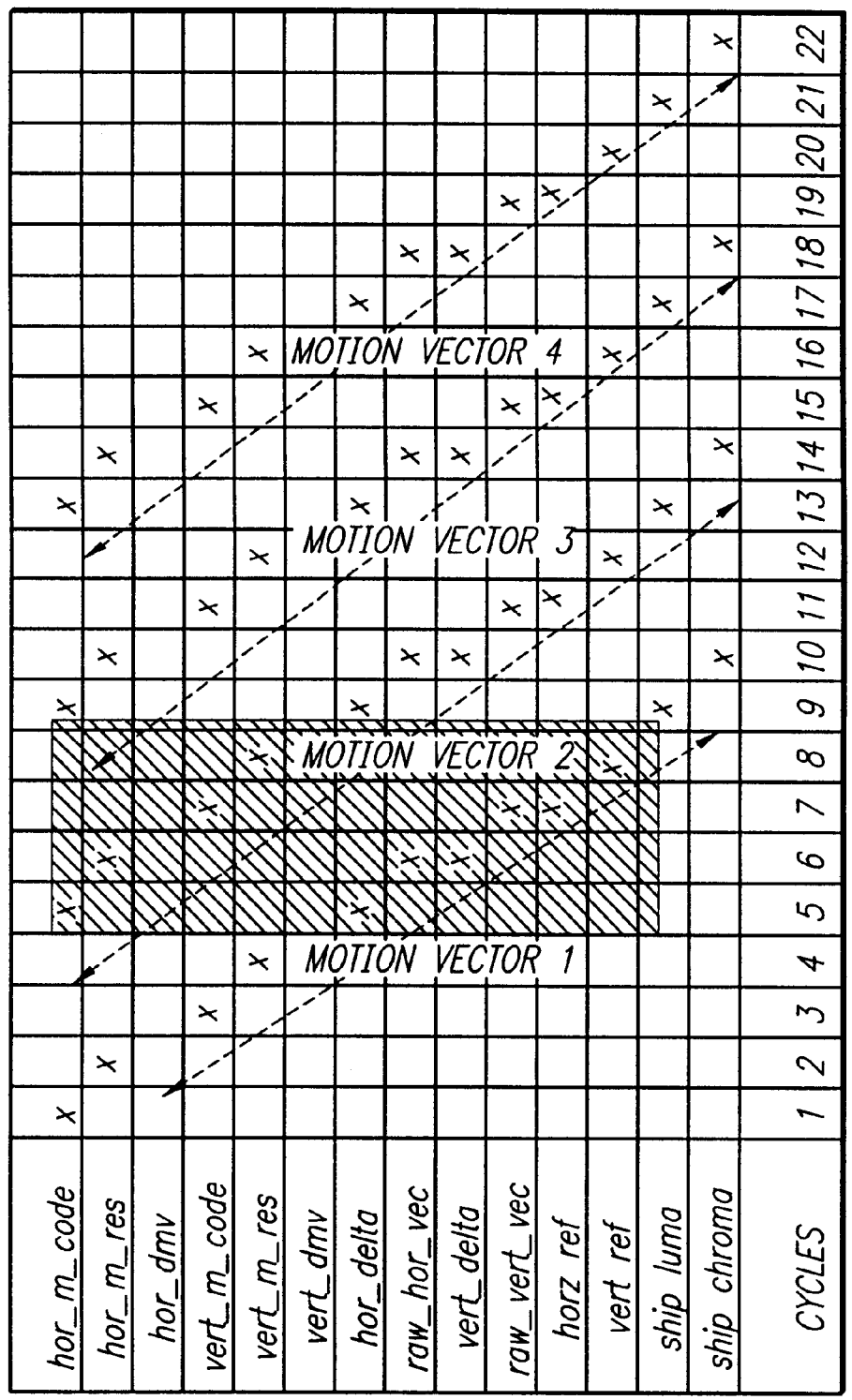
FIG. 16 is a diagram illustrating a worst case scenario of the pipe-lined operation of the motion vector extraction and computation process.

A key aspect of the present invention is that the performance of the motion vector decode process is improved by overlapping the motion vector computation with the extraction phase of the next motion vector of the macroblock. Without employing the scheme of overlapping, the extraction phase and the computation phase the motion vector would require 48 cycles in the worst case. The pipeline chart of FIG. 16 shows the computation active at each cycle and the overlap is highlighted. With the extraction and the computation phase overlapped, the cycle count for the entire motion vector decode for a macroblock is 22 cycles or less. FIG. 16 illustrates the overlap of the extraction phase and the compute phase in a dotted rectangle.

The dotted double arrow line traces the computation of every motion vector in the pipeline. In the worst case, there are 4 motion vectors for which extraction and decode needs to be done numbered as a motion vector 1 through 4.

The overlap in the computation of the horizontal raw vector (raw_hor_vec) and the vertical delta (vert_delta) as well as the overlap of the vertical raw vector (raw_vert_vec) and the horizontal reference vector (horz_ref) are shown in FIG. 16.

The scheme also handles the non-worst case scenarios cleanly. Wait States (stalls) are automatically introduced if the computation pipeline is not done and the extraction pipeline is ready to hand over the extracted information.

The motion vector computation also includes the Dual Prime motion vector computation logic. The total number of cycles for the dual prime computation is 21 cycle in the worst case (dual prime in frame pictures). This includes the cycles for shipping all the dual prime vectors.

Logic Sharing

For improving the speed of the motion vector decoding, the computation of the vertical and the horizontal components of the motion vector is achieved in back to back cycles. This enables sharing of logic between the horizontal component and vertical component calculation while minimizing the cycle count.

The compute phase is divided into the following cycles.

Cycle 1: Computes delta for the horizontal component.

Cycle 2: Computes delta for the vertical component.

Magnitude clipping and the raw motion vector compute for the horizontal component are also done in this cycle.

Cycle 3: Magnitude clipping and the raw motion vector compute for the vertical component. In this cycle, the horizontal component of the luma and the chroma vector with respect to the top left corner of the picture are also computed.

Cycle 4: The vertical component of the luma and the chroma vector with respect to the top left corner of the picture is computed.

Cycle 5: The luma vector is shipped.

Cycle 6: The chroma vector is shipped.

Advantages of Logic Sharing and Pipelining

1) The scheme of the present invention does not replicate logic for the horizontal and the vertical component.

2) The scheme of the present invention has the least register dependency and thus has minimal context passing.

3) The state machine controls for the exact engine and the compute engine exchange very simple handshake. The handshakes are "data ready" from the extract engine and "the ready to accept data" from the compute state machine. This simple handshake reduces control logic.

The following sections discuss the micro-architecture of the motion vector compute pipeline.

Delta Compute Engine

Figure 17:
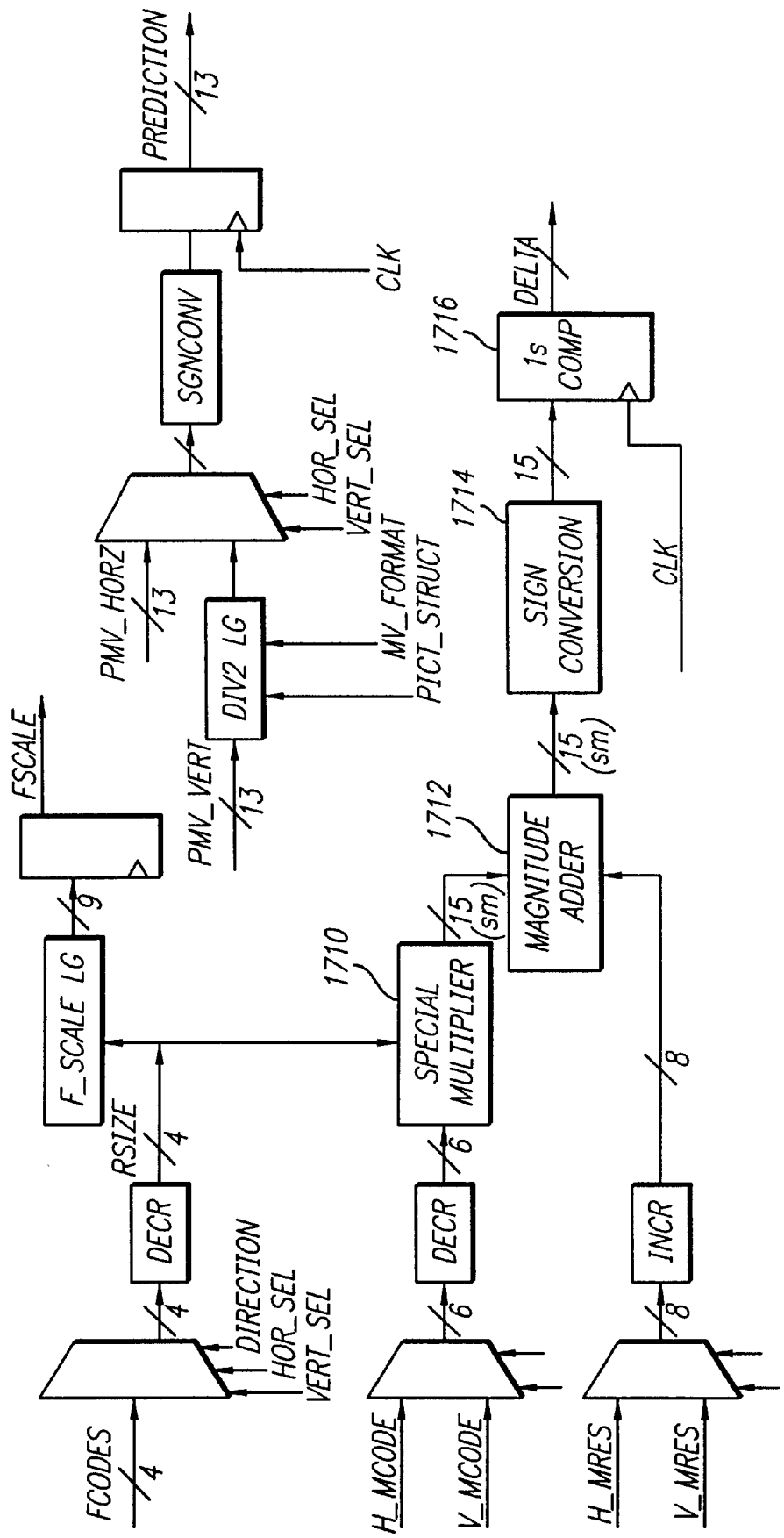
FIG. 17 is functional block diagram of the delta compute engine of the micro-architecture of the motion vector compute pipeline.

FIG. 17 is functional block diagram of the delta compute engine of the micro-architecture of the motion vector compute pipeline. The motion vectors are differentially encoded in the bitstream. The delta compute block is primarily responsible for computing the differential or delta which when added to the predicted motion vector (derived from the motion vector of the previous macroblock) will give the complete raw motion vector. This motion vector will be off-set with respect to the current macroblock.

The delta compute block selects between the horizontal and the vertical motion code and motion residual based on whether the pipeline is in the horizontal or the vertical phase of the computation. The selected motion code is then scaled, at a multiplier 1710, with a fscale value and then added to the selected motion residual by a magnitude adder 1712. The fscale is the scaling factor employed to the scale up the motion code. During encoding, the motion code is scaled down to minimize the bit length of the motion code symbol.

The output of the magnitude adder 1712 is a sign magnitude value of the delta. This is then converted at block 1714 to an 1-complement number and saved in a register 1716. The 1-complement implies the bit-wise logical inversion of a value.

This block also handles the conversion of the PMV to the predicted motion vector, if case frame format to field format is required. The motion code, motion residual and the fcodes are registered inputs to this module. A registered signal is one which is an output of a flip-flop.

Range Clipping and Raw Vector Compute Engine

Figure 18:
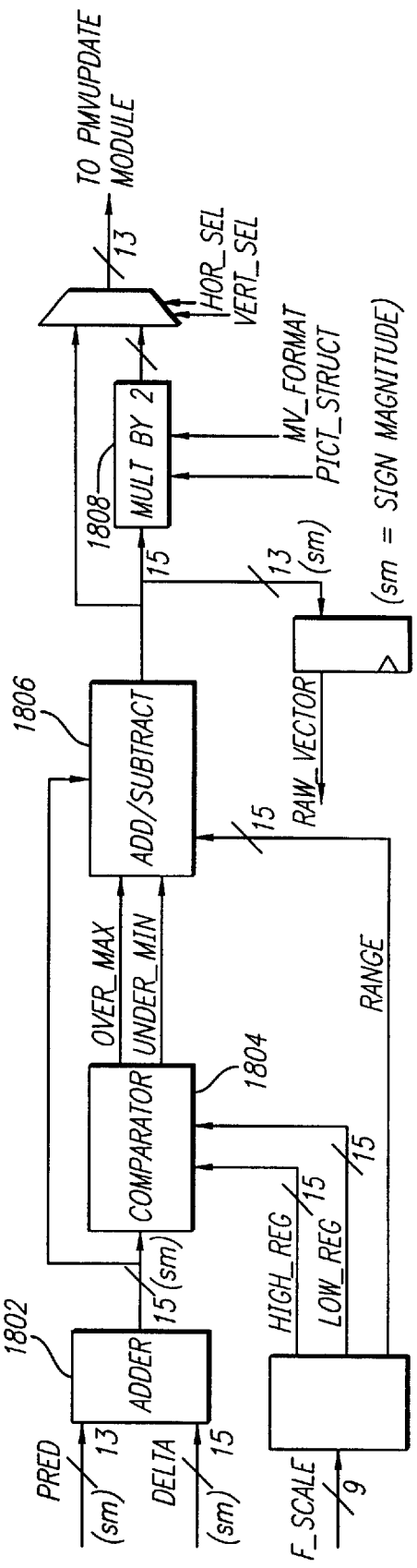
FIG. 18 is functional block diagram of the range clipping and raw vector compute engine of the micro-architecture of the motion vector compute pipeline.

FIG. 18 is functional block diagram of the range clipping and raw vector compute engine of the micro-architecture of the motion vector compute pipeline. This block performs, at adder 1802, the addition of the delta in 1-complement (which was calculated in the delta compute block) and the predicted motion vector derived from the pmv registers. The results of the addition are then compared with the low_reg and the high_reg at comparator 1804. If the value of the result of addition exceeds the high_reg, then the range_reg is subtracted from the result. If the value of the result lies below the low_reg, then the range_reg is added to the result. The output of add/subtract block 1806 is then scaled appropriately at block 1808 depending on the picture structure and the motion vector format and stored in the PMV. The prediction vector, delta and the fscale are registered inputs to this module.

Motion Vector WRT top-left Corner of the Picture

Figure 19:
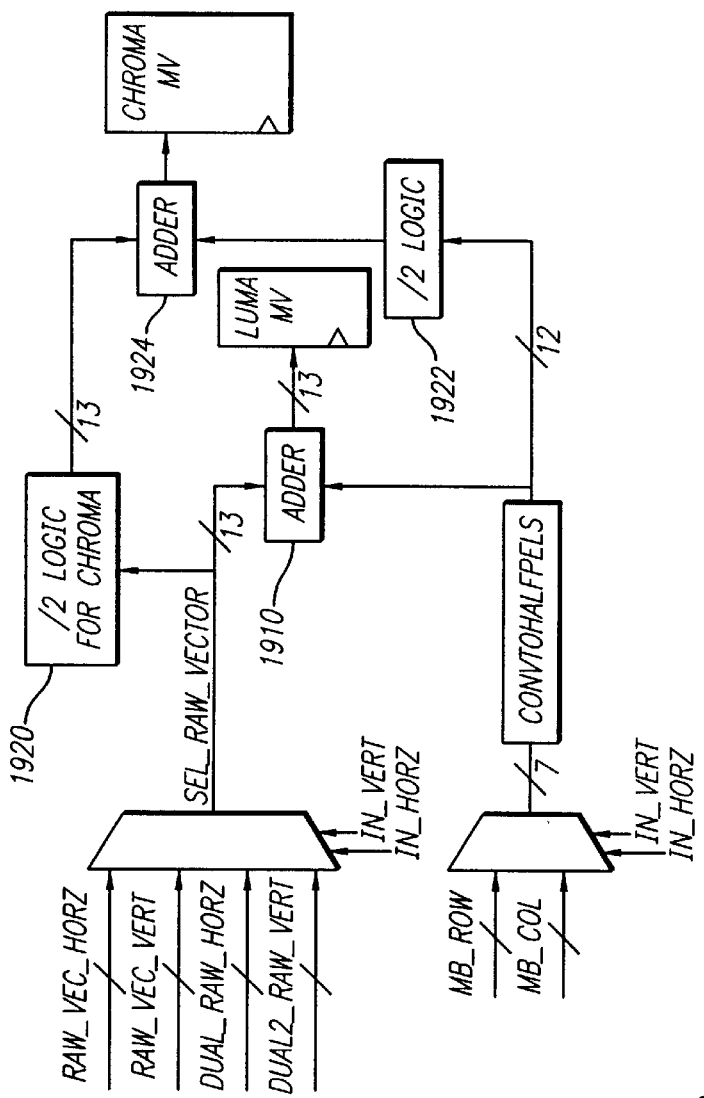
FIG. 19 is functional block diagram of the motion vector wrt top-left corner of the picture block of the micro-architecture of the motion vector compute pipeline.

FIG. 19 is functional block diagram of the motion vector wrt (with respect to) top-left corner of the picture block of the micro-architecture of the motion vector compute pipeline. This block performs the addition of the macroblock coordinates to the raw_vector that is computed by the range clipping and raw vector compute block. Depending on whether the computation is for horizontal component or vertical component, mb_row or mb_col is selected and the components of the raw_vector and dual raw vector are selected. The macroblock coordinates are added at adder 1910 to the raw vector. This computation gives the luma motion vector wrt the top-left corner of the picture. The chroma motion vector is computed by performing a divide by 2 operation (/2, the exact meaning of this operation is set forth in the MPEG2 specification) on the raw vector at block 1920 and the appropriate macroblock coordinates at block 1922 and adding the two results at adder 1924. The raw vector, duel_raw_vector, mb_row and mb_col are registered inputs of this module.

The foregoing scheme results in efficient clock cycle utilization and is critical for meeting a macroblock decode time of less than 8.5 microseconds. The scheme embodies a completely hardware based approach for the motion vector decoding which requires no intervention by the CPU or microcontroller.

Furthermore, logic is minimized via pipelining. More specifically, the computation has a bare minimum of combinational logic and there are no extra registers required to carry context of the motion vectors. The only registers required are the ones to hold the VLD decoded motion parameters. The scheme ensures that the registers are not overwritten before they are used.

LOW DELAY MODE OPERATION IN MBCORE

In order to implement a MPEG video decoder that can support Video conferencing it is imperative that a low delay mode operation is fully supported.

In the following sections, an implementation of a low delay mode operation in mbcore with minimal hardware is disclosed. The implementation achieves the low delay mode operation by stalling the mbcore pipeline flexibly when the data level in the prefetch buffer goes below a certain threshold, e.g., a predetermined threshold. The implementation introduces flexibility and fine grain control in the video decoding architecture. Furthermore, it enables the applicability of the mbcore to Video conferencing applications and is achieved through a low-cost hardware implementation.

Low Delay Mode

In Video conferencing applications using MPEG2, both the rate of data transfer and the quantity of the data transferred are significantly small. Under this scenario, it is very likely that a prefetch buffer, which holds the compressed picture data to be decoded, would run out of data while mbcore is still processing a macroblock. This situation mandates that mbcore be gracefully stalled so that it does not decode any invalid picture data. At the same time, it is necessary for mbcore to restart decoding, loosing minimal time, when valid compressed bitstream becomes available. The mbcore implementation described below supports this scheme and uses minimal hardware to implement it.

Flow of Operations in mbcore

According to a preferred embodiment of the present invention, the operation of mbcore is functionally divided into four stages:

1. slice header processing
2. macroblock header processing
3. motion vector extraction and computation
4. discrete cosine transform coefficient extraction.

Figure 20:
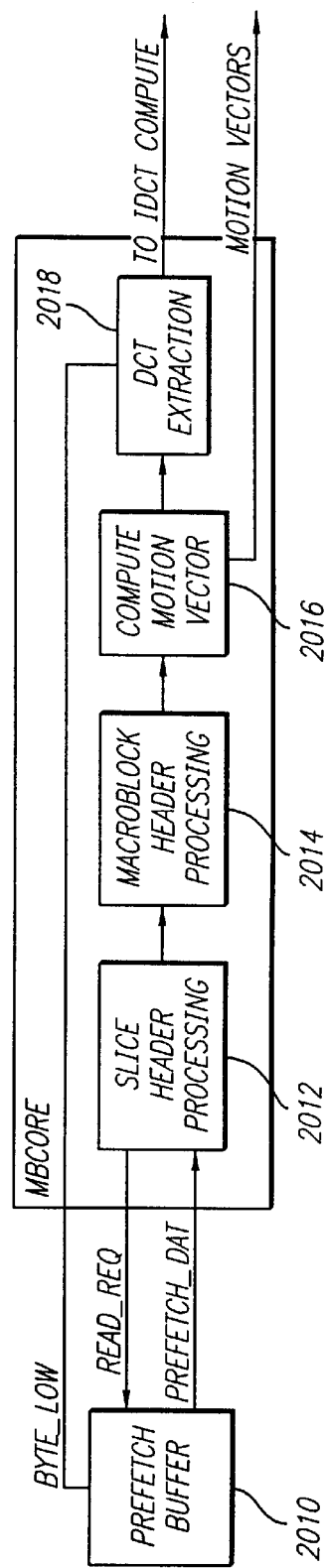
FIG. 20 illustrates a bitstream processing flow in mbcore for a low delay mode operation.

The data for each of these stages appear serially in the video bitstream which is stored in the prefetch buffer. FIG. 20 illustrates the top level division of the bitstream processing flow in mbcore.

There is data steering logic in mbcore that steers data from a prefetch buffer 2010 to the various functional blocks 2012, 2014, 2016, 2018 of mbcore as required by the blocks. The bytes_low, when asserted, indicates that the prefetch logic is about to run out of data. On receiving the bytes_low signal, the functional blocks stop requesting data from the data steering logic which in turn desserts the read request to the prefetch buffer 2010. The operation resumes when the data becomes available with no cycle hit.

Detailed Operation of Low Delay Mode in mbcore

The mbcore is designed to check status of the prefetch buffer 2010 at the following points of operation:

a) At the start of a slice;
b) At the beginning of dct decoding; and
c) At the beginning of every coded block.

If all blocks in a macroblock area coded, then there are 6 such checks to be performed.

The check in case a) ensure that there are 264 bits or 33 bytes of data in the prefetch buffer 2010 before starting decoding. This data requirement is the worst case requirement to finish decoding up to and all the motion vectors.

The checks in cases b) and c) ensure that there is enough data in the prefetch buffer 2010 to complete decoding of a block of dct coefficients. This requires the prefetch buffer 2010 to contain 224 bytes of data before the decode operation begins.

The byte_low signal is checked combinationally when the slice processing state machine is in the state of processing the slice header. The state transition in slice state machine is gated by the byte_low signal. In the dct block, the byte_low signal is checked when the dct state machine is processing the "end of block" symbol. At this point, the bytes_low signal is combinationally checked and state transition to the state of processing of the coefficients of the next block is gated by the bytes_low signal.

In this approach, no symbol is split between the prefetch buffer and mbcore. Thus, stops occur at clean symbol boundaries in the decode process when the bytes low is active.

The disclosed system for low delay mode is a completely hardware based approach. It requires no intervention by the CPU or microcontroller. The byte_low signal is generated in hardware and used in hardware without CPU intervention. The checks are implemented using simple gating logic at minimal check points. Thus, the disclosed system allows for completely asynchronous operation of the prefetch buffer and mbcore.

The disclosed scheme is essential for Video conferencing using MPEG2. Once the prefetch buffer threshold is reached, the decoding is extremely fast. There is no extra wait state inserted to restart bit stream processing and the processing consumes a minimal number of cycles (less than 8.5 microseconds). This is possible because the symbols are not split.

Furthermore, the system advantageously allows the size of the prefetch buffer to be minimized. With this scheme, the prefetch buffer needs to be no larger than 224 bytes. This scheme allows for the prefetch buffer to be filled in parallel to consumption of the video data from the prefetch buffer. If such a scheme did not exist, either of the following two schemes would be required: (a) the prefetch buffer would have to be large enough to hold the entire picture; or (b) the decoder would have to request symbols from the memory system directly every time it needs symbols. Scheme (a) is prohibitive because of the memory requirement of the decoder. Scheme (b) is prohibitive because of the high memory bandwidth requirements of the decoder and also because such memory requests may cause symbol splitting between memory requests which will disallow single cycle VLD symbol decode.

While the invention has been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A system for low delay mode operation video decoding comprising:

a prefetch buffer; and an macroblock core including an macroblock core pipeline, said macroblock core being adapted to check a status of said prefetch buffer in a predetermined manner and to implement a low delay mode to delay said macroblock core pipeline when a data level of said prefetch buffer goes below a threshold.

2. The system for low delay mode operation video decoding of claim 1 wherein:

said macroblock core is adapted to prevent a symbol from splitting between said prefetch buffer and said macroblock core.

3. The system for low delay mode operation video decoding of claim 1 wherein:

said macroblock core is adapted to implement said low delay mode in hardware without inputs from a CPU or microcontroller.

4. The system for low delay mode operation video decoding of claim 1 wherein:

said prefetch buffer and said macroblock core operate asynchronously.

5. The system for low delay mode operation video decoding of claim 1 wherein:

said macroblock core is adapted to implement said low delay mode depending upon a stage within an operation of said macroblock core.

6. The system for low delay mode operation video decoding of claim 5 wherein:

said operation is said operation of said macroblock core is comprised of a plurality of stages.

7. The system for low delay mode operation video decoding of claim 6 wherein:

said plurality of stages comprise:
 a slice header processing stage;
 a macroblock header processing stage;
 a motion vector extraction and computation stage; and
 a discrete cosine transform coefficient extraction stage.

8. The system for low delay mode operation video decoding of claim 7 wherein:

data from each of said stages appears serially in a video bitstream which is stored in said prefetch buffer.

9. The system for low delay mode operation video decoding of claim 1 wherein:

said macroblock core is adapted to check said data level at predetermined points in an operation of said macroblock core.

10. The system for low delay mode operation video decoding of claim 9 wherein:

said predetermined point comprises a time at a start of a slice.

11. The system for low delay mode operation video decoding of claim 9 wherein:

said predetermined point comprises a time at a beginning of dct decoding.

12. The system for low delay mode operation video decoding of claim 9 wherein:

said predetermined point comprises a time at a beginning of a coded block.

13. The system for low delay mode operation video decoding of claim 1 wherein:

said macroblock core is adapted to ensure that there is a sufficient quantity of data in said prefetch buffer for a particular operation.

14. The system for low delay mode operation video decoding of claim 13 wherein:

said particular operation comprises completely decoding all motion vectors.

15. The system for low delay mode operation video decoding of claim 13 wherein:

said particular operation comprises completely decoding a block of dct coefficients.

16. A system for low delay mode operation video decoding comprising:

a prefetch buffer; and an macroblock core including an macroblock core pipeline, said mbcore being adapted to check a status of said prefetch buffer at predetermined times including a time at a start of a slice, a time at a beginning of dct decoding, and a time at a beginning of a coded block, and to implement a low delay mode to delay said mbcore pipeline when a data level of said prefetch buffer goes below a threshold at said predetermined times.

17. The system for low delay mode operation video decoding of claim 16 wherein:

said macroblock core is adapted to prevent a symbol from splitting between said prefetch buffer and said macroblock core.

18. The system for low delay mode operation video decoding of claim 16 wherein:

said macroblock core is adapted to implement said low delay mode without inputs from a CPU or microcontroller.

19. The system for low delay mode operation video decoding of claim 16 wherein:

said prefetch buffer and said macroblock core operate asynchronously.

20. A method for low delay mode operation video decoding comprising the steps of:

providing a prefetch buffer; and providing an macroblock core including an macroblock core pipeline, said macroblock core being adapted to check a status of said prefetch buffer at predetermined times during an operation of said macroblock core and to implement a low delay mode to delay said macroblock core pipeline depending upon said status at said predetermined times.

* * * * *